(12) United States Patent
Olden et al.

(10) Patent No.: US 8,990,911 B2
(45) Date of Patent: Mar. 24, 2015

(54) SYSTEM AND METHOD FOR SINGLE SIGN-ON TO RESOURCES ACROSS A NETWORK

(75) Inventors: Eric Olden, Lyons, CO (US); Darren C. Platt, Longmont, CO (US); Coby Royer, Boulder, CO (US); Keshava Berg, Lafayette, CO (US); Joseph H. Wallingford, III, Longmont, CO (US)

(73) Assignee: EMC Corporation, Hopkinton, MA (US)

( * ) Notice: Subject to any disclaimer, the term of this patent is extended or adjusted under 35 U.S.C. 154(b) by 818 days.

(21) Appl. No.: 12/410,971

(22) Filed: Mar. 25, 2009

(65) Prior Publication Data

US 2009/0249439 A1      Oct. 1, 2009

Related U.S. Application Data

(60) Provisional application No. 61/040,673, filed on Mar. 30, 2008, provisional application No. 61/094,972, filed on Sep. 7, 2008.

(51) Int. Cl.
*H04L 29/06* (2006.01)

(52) U.S. Cl.
CPC ............ *H04L 63/0815* (2013.01); *H04L 63/20* (2013.01); *H04L 63/101* (2013.01)
USPC ..................................... 726/8; 726/1; 726/28

(58) Field of Classification Search
CPC ..... H04L 63/0815; H04L 63/08; H04L 63/10; H04L 63/20
USPC ................................ 726/1, 8, 10, 5–7, 27, 28
See application file for complete search history.

(56) References Cited

U.S. PATENT DOCUMENTS

| | | | |
|---|---|---|---|
| 6,892,307 B1 * | 5/2005 | Wood et al. ........................ 726/8 |
| 7,225,462 B2 | 5/2007 | Bass et al. |
| 7,444,519 B2 * | 10/2008 | Laferriere et al. ............ 713/185 |
| 7,493,402 B2 * | 2/2009 | McCarty et al. ............... 709/229 |
| 7,512,965 B1 * | 3/2009 | Amdur et al. ...................... 726/1 |
| 7,512,981 B2 * | 3/2009 | Pearson .......................... 726/23 |
| 7,530,099 B2 * | 5/2009 | Flurry et al. ...................... 726/8 |
| 7,594,112 B2 * | 9/2009 | Patrick et al. ................. 713/166 |
| 7,610,617 B2 * | 10/2009 | Kelly et al. ......................... 726/5 |
| 7,657,639 B2 * | 2/2010 | Hinton ........................... 709/229 |

(Continued)

FOREIGN PATENT DOCUMENTS

KR     10-2005-010854 A1     11/2005

OTHER PUBLICATIONS

IM, Dae Shik, "PCT International Search Report re Application No. PCT/US09/038254", Nov. 23, 2009, Published in: PCT.

*Primary Examiner* — Zachary A Davis
(74) *Attorney, Agent, or Firm* — BainwoodHuang

(57) ABSTRACT

Systems, methods and apparatus for providing single sign on across a plurality of resources is disclosed. An exemplary method includes receiving a request from a user to access a particular one of the plurality of resources; establishing an SSO session for the user if an SSO session has not been established; determining if the user has been authenticated to the particular resource, and if not, retrieving credentials for the user that are specific to the resource; presenting the credentials to the resource so as to create a session with the resource; and presenting a user interface for a customer to configure which of the plurality of resources can be accessed by users.

9 Claims, 14 Drawing Sheets

(56) References Cited

U.S. PATENT DOCUMENTS

| | | | |
|---|---|---|---|
| 7,958,347 B1 * | 6/2011 | Ferguson | 713/155 |
| 8,418,238 B2 * | 4/2013 | Platt et al. | 726/8 |
| 8,510,810 B2 * | 8/2013 | Solin et al. | 726/5 |
| 8,819,814 B1 * | 8/2014 | Leach et al. | 726/21 |
| 2003/0200465 A1 | 10/2003 | Bhat et al. | |
| 2005/0021956 A1 | 1/2005 | Genty et al. | |
| 2008/0244719 A1 * | 10/2008 | Hariya et al. | 726/8 |
| 2009/0249440 A1 | 10/2009 | Platt et al. | |

* cited by examiner

Credential Store

Policy Cache

User Store

| User ID | Dept | Role | Status |
|---|---|---|---|
| IDexamp1 | Engr | Engineer | Employee |
| IDexamp2 | Ops | Director | Employee |
| ⋮ | | | |
| IDexampN | Sales | Rep | Contractor |

FIG. 5D

SYSTEM AND METHOD FOR SINGLE SIGN-ON TO RESOURCES ACROSS A NETWORK

PRIORITY

This application claims priority to both U.S. provisional Application No. 61/040,673, filed Mar. 30, 2008 entitled Identity as a Network Service; and U.S. Provisional Application No. 61/094,972 filed Sep. 7, 2008 entitled Identity as a Network Service; both of which are incorporated by reference.

RELATED APPLICATIONS

The present application is related to U.S. application Ser. No. 12/410,992, filed 19 Mar. 2014 and entitled SYSTEM, METHOD, AND APPARATUS FOR MANAGING ACCESS TO RESOURCES ACROSS A NETWORK filed Mar. 25, 2009.

FIELD OF THE INVENTION

This invention relates generally to the field of networked resources, and more particularly to single sign-on and access management relative to networked resources.

BACKGROUND OF THE INVENTION

In the early 2000's, software as a service (SaaS) established itself as a better way to deliver business value with an "on demand" model. SaaS broke the painful cycle of buying expensive software suites with bloated feature sets and unrealized promises, coupled with uncertain and risky outcomes. Companies like Salesforce.com, Taleo, Postini, Qualys, WebEx and Netsuite experienced meteoric growth. With growth came growing pains and companies found that SaaS alone wasn't a silver bullet.

SaaS was a game changer in customer relation management (CRM), enterprise resource planning (ERP), collaboration, email and network security because it solved the cost and complexity problems that dogged many enterprise software deployments. One of the most expensive and complex IT problems—identity management—remained to be addressed.

The lack of an identity management capability for SaaS had two implications. The first was the lack of a purpose-built SaaS identity solution to solve the unique authentication, access, provisioning and authorization problems encountered when deploying SaaS apps. The second ramification was the continued focus of identity solutions as an expensive enterprise infrastructure for the enterprise market. This continues to keep the benefits of identity management beyond the reach of most midmarket companies.

Identity management is complex and involves a lot of "moving parts" which is why historically identity management systems were themselves complex. The first-generation identity approach requires tremendous expertise in identity, security, middleware, databases, directories, web/app servers, backed by a team of administrators, developers, integrators, auditors—just to get the foundations in place.

Factor in deployment and integration efforts and these massive first-generation identity projects often took years to get up and working. Compounding the problem is the constant change and upgrade cycles. It wasn't uncommon for a modest deployment of several thousand identities to cost many hundreds of thousands of dollars.

Although present identity management technologies are somewhat functional, they are overly complex or otherwise unsatisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment the invention may be characterized as a system for providing single sign on across a plurality of resources. The system in this embodiment includes an authentication connector configured to communicate with at least one authentication subsystem to authenticate a user; at least one adaptor configured to receive a credential set from a credential data store and, utilizing information from the credential set, communicate with the resource corresponding to the received credential set to authenticate the user to the resource; and a single sign-on (SSO) engine configured, responsive to a request from a user, to retrieve the credential set corresponding to the resource requested by the user and provide the credential set to the adaptor to enable the adaptor to authenticate the user to the resource without requiring the user to perform additional authentication for that resource.

In another embodiment, the invention may be characterized as a method for providing single sign on across a plurality of resources. The method in this embodiment includes receiving a request from a user to access a particular one of the plurality of resources; establishing an SSO session for the user if an SSO session has not been established; determining if the user has been authenticated to the particular resource, and if not, retrieving credentials for the user that are specific to the particular resource; presenting the credentials to the particular resource so as to create a session with the particular resource; and presenting a user interface for a customer to configure which of the plurality of resources can be accessed by users.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 5D depicts exemplary content that may reside in a user store, which the user store connector depicted in FIG. 5A may retrieve information from;

DETAILED DESCRIPTION

Figure 1:
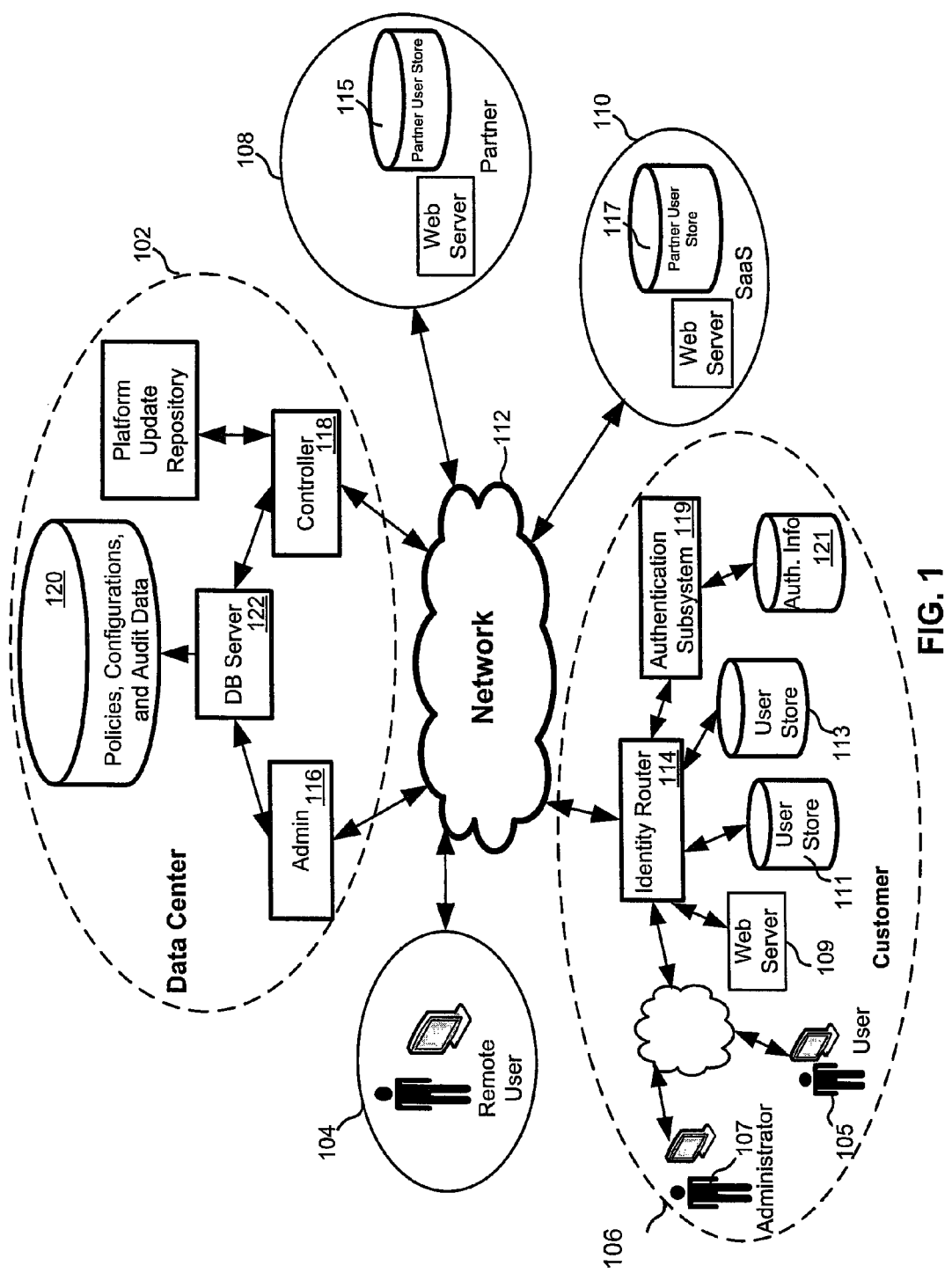
FIG. 1 is a block diagram depicting an environment in which several embodiments of the invention may be implemented.

Referring now to the drawings, where like or similar elements are designated with identical reference numerals throughout the several views, and referring in particular to FIG. 1, it is a block diagram depicting an environment in which several embodiments of the invention may be implemented. As shown, a data center 102, remote user 104 (e.g., a person or system), a customer 106, partner 108 and a SasS provider 110 are all communicatively coupled through a network 112 (e.g., the Internet and/or local or wide area networks).

Although only one remote user 104, customer 106, partner and SaaS provider 110 are depicted, each of these logically represents a potentially unlimited number of entities. It should also be recognized that because the illustrated arrangement of components in FIG. 1 is logical, it is not meant to be an actual hardware diagram. Thus, many of the components can be combined or further separated in an actual implementation. For example, the identity router 114 (also referred to as an appliance) in some embodiments may be implemented within the data center 102. Moreover, the construction of each individual component in light of this disclosure will be well-known to those of skill in the art.

In general, the data center 102 in connection with the identity router 114 in this exemplary embodiment provides a variety of identity-management-related services to customers in a unified manner. More particularly, the data center 102 and identity router 114 allows single-sign-on (SSO), authentication, access control, and authorization (e.g., fine-grained authorization) to be employed across resources (e.g., applications) that are both internal and external to a customer—including applications and data that may be externally hosted by disparate entities (e.g., partner entities 108 and SaaS entities 110) that are organizationally unrelated to the customer 106 (e.g., entities falling under separate and distinct corporate governance).

As shown in FIG. 1, the data center 102 includes an admin server 116 that generally functions as a user interface to the administrator 107 when accessed via computer at the customer's location. And from the customer's location or from other locations on the network, the administrator may access the admin server 116 to set policies for users (e.g., the remote user 104 and the internal user 105) relative to both resources that are local to the customer 106 and to applications and data stores that are remotely located from the customer 106. Moreover, the administrator 107 may set policies that define what particular features and/or data that the users (e.g., persons or systems) may access at the remote locations. Although the administrator is depicted as communicating with the data center through the identity router, this is certainly not required. In other implementations, for example the administrator is located outside of the customer location.

This functionality is in contrast to identity management technology of the past, which only provided identity management functions (e.g., SSO, authentication enforcement, authorization enforcement, and audit capabilities) for people and applications within one organization. Although additional products were created (and deployed as an add-on) to allow federated SSO and SaaS SSO with other companies (e.g., SaaS partners 110 and business partners 108), these add-ons did not provide a way for a company to enforce authentication and authorization for the company's users on other partner or unaffiliated SaaS websites.

Moreover, the add-on that enabled SSO was a separate product from the company's internal authentication and authorization management software. As a consequence, an administrator had to deploy and learn two separate software products, and that administrator was still unable to enforce authentication and authorization for the company's users on partner's applications.

In contrast, the data center 102 in connection with the identity router 114, as depicted in the present embodiment, enables an administrator (e.g. administrator 107) to carry out security management (e.g., authentication and authorization) in one place, using one easy-to-use interface that is served up by the admin server 116 so that the administrator 107 may set policies that govern the particular internal and external applications and data stores that each user (e.g., a person or system) may access. By way of example, the administrator 107 of the depicted customer 106 may set policies that define what resources and what data the remote 104 and local user 105 may access at the partner 108 and SaaS 110 sites by simply accessing the admin server 116 and defining the policies using the interface that is provided by the admin server 116.

Moreover, the data center 102 in connection with the identity router 114 provides unified identity-management-related services (e.g., SSO, authentication enforcement, authorization enforcement, and audit capabilities) as a service via a network—not software. Thus, provisioning is done quickly, (e.g. on a subscription basis), and the service can be turned on and off, on demand. As a consequence, the administrator 107 does not have to undergo the onerous process of installing and configuring software (e.g., enterprise infrastructure software) nor does the customer 106 have to make the capital and resource commitments associated with software deployment.

And the administrator 107 need only learn the interface provided by the admin server 116.

As depicted in FIG. 1, once the administrator 107 sets policies for users 104 and 105, the policies are centrally stored in the policies, configurations and audit (PCA) database 120 within the data center 102, and the controller 118 pushes the policies to the identity router 114. And once the policies are received at the identity router 114, the identity router 114 is disposed so as to intercept any user requests to access a resource (e.g., the customer web server, partner web server or SaaS web server), and the identity router 114 applies the policies with known information about the user to determine whether the user should be allowed to access the requested resource.

As shown, the identity router 114 is in communication with an authentication subsystem 119, which has access to authentication information 121. In general, the authentication subsystem 119 is a system that is capable of validating credentials utilizing information from the authentication information store 121 that may be validated (e.g., by the identity router 114). It receives one or more requests from the identity router, which acts on a user or system's behalf, challenging the user or their software client to provide information that can be received and processed by the authentication subsystem 119 to validate that user.

Another benefit to the present embodiment is the scalable nature of the architecture. From the perspective of the customer 106, for example, the database in the data center 102 enables policies to be stored and managed in one location while multiple identity routers are deployed among multiple locations in the customer's organization. As a consequence, a single, consistent and standardized set of policies may be employed across an organization that may, for example, have offices in Los Angeles, New York and Tokyo. And if an identity router fails in one location, the controller 118 may resend the policies to the replacement identity router. From the perspective the data center 102, additional customers may be easily serviced (e.g., on a subscription basis) using the same infrastructure (e.g., the same admin 116, DB server 122, and controller 118). Thus, the data center 102 is able to provide inexpensive identity management as a service to a large number of customers.

Figure 2:
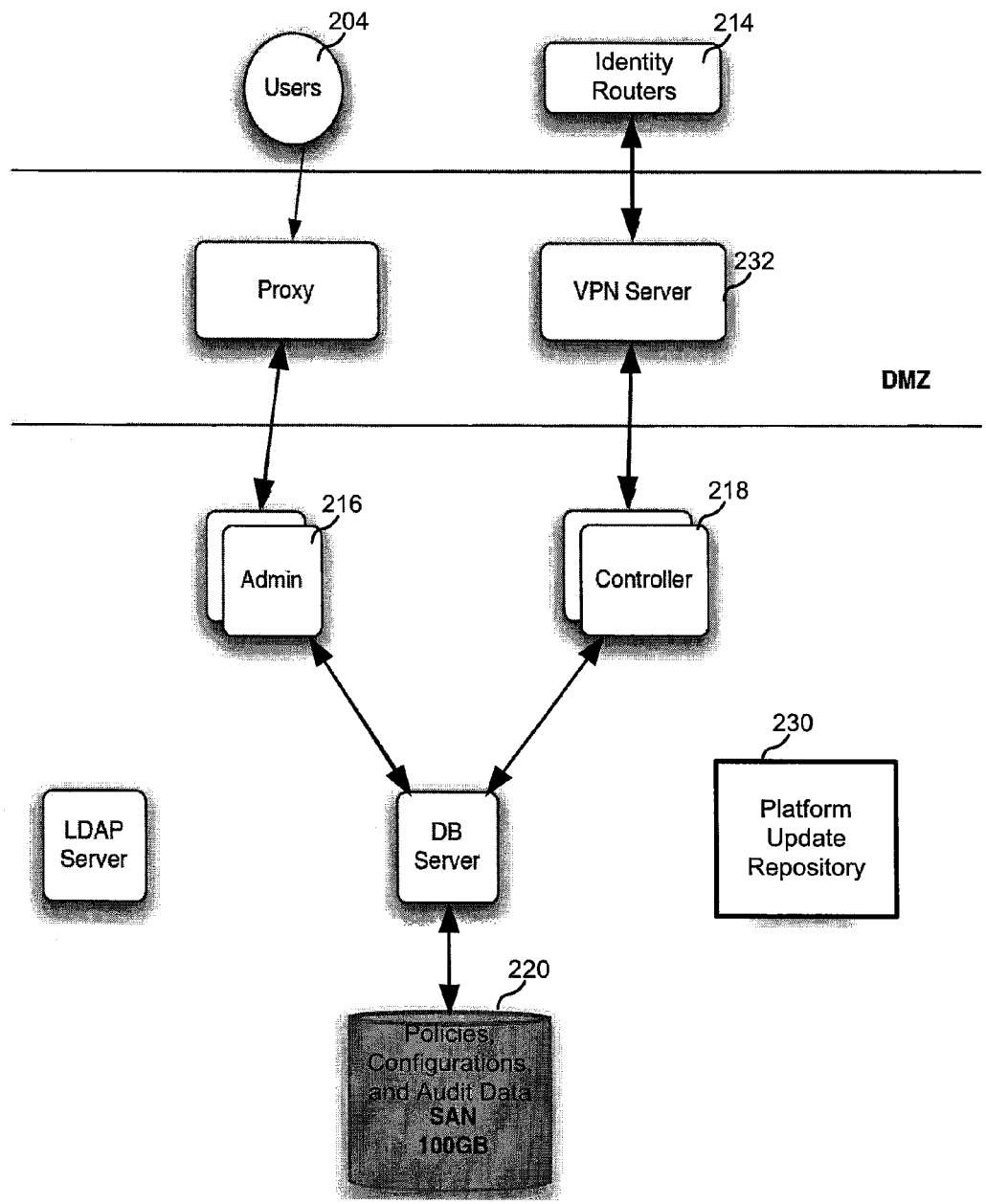
FIG. 2 is a block diagram depicting an embodiment of the general architecture of the data center described with reference to FIG. 1.

Referring next to FIG. 2, shown is a block diagram depicting an embodiment of the general architecture of the data center described with reference to FIG. 1. As shown, the data center includes an admin server 216 that generally enables a customer's administrator to set policies for the customer's users relative to resources (e.g. applications and data stores) regardless of whether the resources are local or remote.

And in addition, the admin server 216 may be used to receive information about resources (e.g., data stores) that are available at the customer's site. For example, if a new user store (e.g., LDAP directory) is deployed in the customer facility, the administrator (e.g. administrator 107) may access the admin server 216 and provide the admin server 216 with information to enable the identity router 214 to access the new data store (e.g., the location of the data store, how to connect with the data store, credentials (e.g., username and password) used to connect with the data store etc.).

In many embodiments, the admin server 216 then accesses the new user store, and through a user-store-discovery process, the admin server discovers the attributes that are available in the new user store. For example, the admin server 216 may go to the URL of the data store, provide the username and password, and request the schema from the new user store, and based upon the schema, the admin 216 server determines what attributes are available to use in policies. In some embodiments, to facilitate the user-store-discovery process, a user-mapping is generated between different user stores at the customer's location. For example, a user may be identified by different names in each of two or more user stores, and in these instances, data that uniquely identifies a user (e.g., an email address) may be identified in each of the data stores and utilized to identify data about each user across disparate data stores.

Once the admin server 216 has obtained schema information from the customer's user store, in many embodiments, the admin server 216 provides a user interface to the administrator that enables policies to be established based upon the attributes that are available in the data store. For example, if the newly added data store includes a role attribute and the name of each employee of the customer, then the administrator can set policies as a function of the name and/or the role of the user relative to both applications/data stores within the customer's organization and outside the customer's organization (e.g., the remote partners 108 and SaaS providers 110). By way of further example, an administrator may establish a policy requiring the role of a user to be a supervisor before a user within the customer's organization may access a particular application at a particular partner's website.

In the embodiment depicted in FIG. 2, the policies, configurations and audit (PCA) database 220 contains the policies that are utilized by the identity routers 214 and configurations that may be pushed down to the identity routers 214. In addition, as discussed further herein, the PCA database 220 may store audit information.

There are several types of policies that may be defined including: access control, authentication, authorization, audit policies, single sign-on, compliance, personalization, and identification-proofing. The access control policy defines what particular users are able to do. In other words, access control is a set of rules that determine who is allowed to access particular applications and functions therein. The authentication policies include information that is used to validate the identity of the user. For example, authentication policies may include username and password, a secure identification, certificate, token, or key card to validate the identity of the user before an authorization policy is run.

Once a user has been authenticated, the system determines whether the user is allowed to access a resource and the functions it contains by enforcing the authorization policies that were defined for the resource by an administrator. For example, an authorization policy may be used to govern whether a user can access the home page of an application, make a wire transfer from within the application, what data a user can access, whether the user can make changes to stored data etc.

The audit policies define what type of information that is saved (e.g., for subsequent audit). For example, when a user accesses a resource, the audit policies determine what activities and information are logged considering issues such as security and privacy (e.g., an audit policy may determine that actual values of a transaction are not stored). In addition, audit policies may govern the types of administrative changes to policies that are logged.

Session policies include rules that define how long a user session is maintained alive before the user is challenged to authenticate the user's identity again, and the length of time allowed before there is a timeout due to inactivity. With respect to single sign-on policies, they define the applications that users can have single sign-on to. Compliance policies are rules that are established for policies. For example, a compliance policy may enforce rules that require separation of duty (e.g., users that are responsible for generating sales revenue may be prevented from altering records that log sales revenue). Beneficially, the ability to define compliance policies within the framework of the data center architecture enables policies to be easily established so that compliance with various regulations (e.g., Sarbanes-Oxley Act (SOX), Gramm-Leach-Bliley Act (GLBA), the Health Insurance Portability and Accountability Act of 1996 (HIPAA), the Payment Card Industry Data Security Standard (PCI DSS)) is built into the system so it automatically enforces the regulations.

With respect to personalization policies, these are policies that enable content to be provided to a user based upon the identity of the user. For example, when a user logs in, the user can be presented with a list of all the resources that the user is allowed to access. In addition, information from data stores can be passed back to an application automatically based upon the identity of the user accessing the application (e.g., when a particular user accesses a loan application, data that defines loan limits for the particular user could be pulled from a user store).

Once policies are established, the controller 218 pushes the policies to the customer's identity router 214 so that the identity router 214 may apply the policies in connection with user requests. In addition, the controller 218 also pushes down patches and application updates, which are stored in the platform update repository 230. As depicted, in the exemplary embodiment a virtual private network (VPN) connection 232 may be established for communications between the controller 218 and the identity router 214.

As shown, in this embodiment a customer identity router 214 resides in a customer's data center (or in a third party's datacenter), but this is certainly not required, and in other embodiments discussed further herein, the identity router 214 may be hosted by the same entity that manages the data center. In accordance with the exemplary architecture depicted in FIG. 2, regardless of where the identity router 214 is located or what entity manages the identity router 214, the identity router 214 generally acts as a filter to the customer's applications. As shown, the identity router 214 sits in front of customer's applications and protects the customer's applications, and it communicates back to the data center servers back through the VPN connection 232.

As an example, when a user 204 inside or outside of the customer network attempts to access a web server (e.g. web server 109) on customer's site 214, the identity router intercepts the request, and determines whether the user has been authenticated. In some embodiments, the identity router 214 determines whether a user has been authenticated by looking for a cookie on the user's browser, and if the cookie is found, the cookie is used to securely identify the user and associate them with their existing session information. This information is then used to apply the policies pushed to the identity router 214 by the controller 218.

And when a user within the customer's organization attempts to access a resource at a partner or SaaS site, in many embodiments, the identity router 214 accesses the customer's data store (e.g. user store 111)(e.g., Lightweight Directory Access Protocol (LDAP) directory or database) to access stored information about the user and determines whether the user has the credentials to access the resource. In many implementations, when a user that is internal to the customer requests access to a remote site (e.g., a separate domain), it is contemplated that known communication protocols (e.g., Security Assertion Markup Language (SAML), WS-Federation, card space, etc.) may be used for the communication. In addition to using these standard protocols, the identity router 214 may act on a user's behalf to perform a login ceremony with a remote site and then transfer the session that is created to the end user.

Thus, the architecture depicted in FIG. 2 enables identity to be abstracted so that it is not dependent upon where the resource resides, and as a consequence, a virtual interface is provided to both the local user stores (e.g. user store 111, 113) and the remote user stores (e.g. partner user stores 115, 117) at partner sites. As a consequence, the identity router 214 is able to provide a simple, single point of access to enable an administrator (e.g. administrator 107) at the customer (e.g. customer 106) to establish policies for user access to local and remote resources.

The general architecture depicted in FIG. 2, is scalable and applies across a variety of implementations. In some embodiments for example, one identity router could be used in connection with two or more customers, or there could be multiple identity routers in the data center for multiple customers. Moreover, multiple data centers may be deployed for availability and performance. It should also be recognized that for purposes of stability, in many embodiments, one or more of the depicted components depicted in FIGS. 1 and 2 and are duplicated for redundancy and failover purposes.

Figure 3:
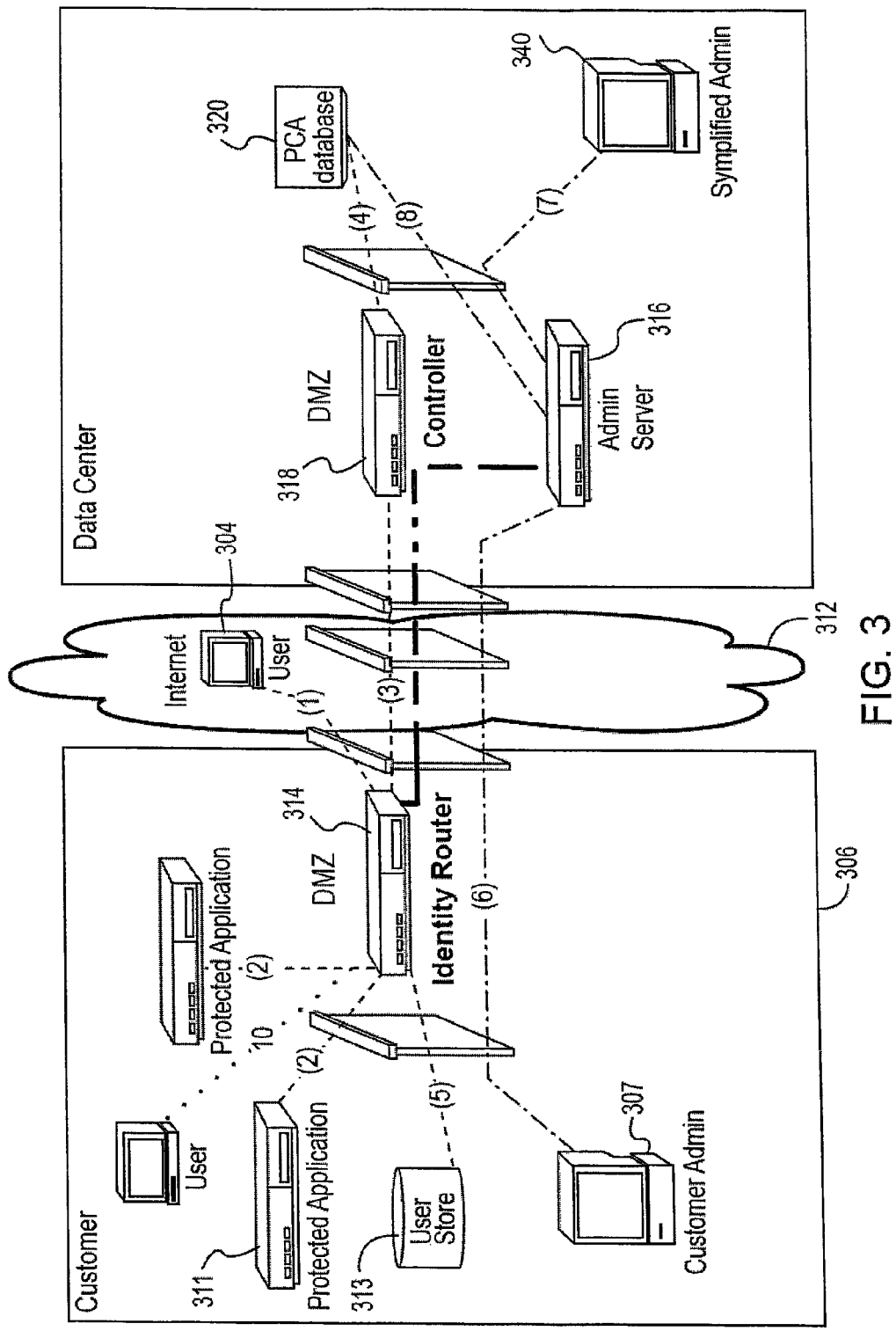
FIG. 3 is a schematic representation of an exemplary arrangement of components and communication pathways in accordance with one embodiment.

Referring next to FIG. 3, there is shown a representation of components and communication pathways in an exemplary embodiment in which an identity router is deployed within a customer's data center. As shown, when a remote user 304 that is coupled to the customer 306 via the Internet 312 (or is accessing an application directly from within the customer network, e.g., via an HTTP/HTTPS connection) attempts to access a protected application 311 (e.g., hosted by the customer)(Paths 1, 2, and 10), the request is intercepted by the identity router 314, and the identity router 314 accesses user data from the user store 313 (Path 5) in order to apply one or more policies (residing in the identity router 314) to the user data in order to determine whether to allow the user 304 to access the protected application 311.

As shown, an administrator 307 in this embodiment is able to manage policies via the admin server 316 from the customer's location (Path 6), and the admin server 316 communicates with the PCA database 320 to add, change or remove policy information (Path 8), and as shown, the data center administrator 340 is able to add, change, and remove configuration data to/from the PCA database 320 (Paths 7 and 8). As depicted, the controller 318 is disposed to receive policies and configuration data from the PCA server 320 (Path 4), and push the policies and configuration data to the identity router 314 (Path 3).

Figure 4:
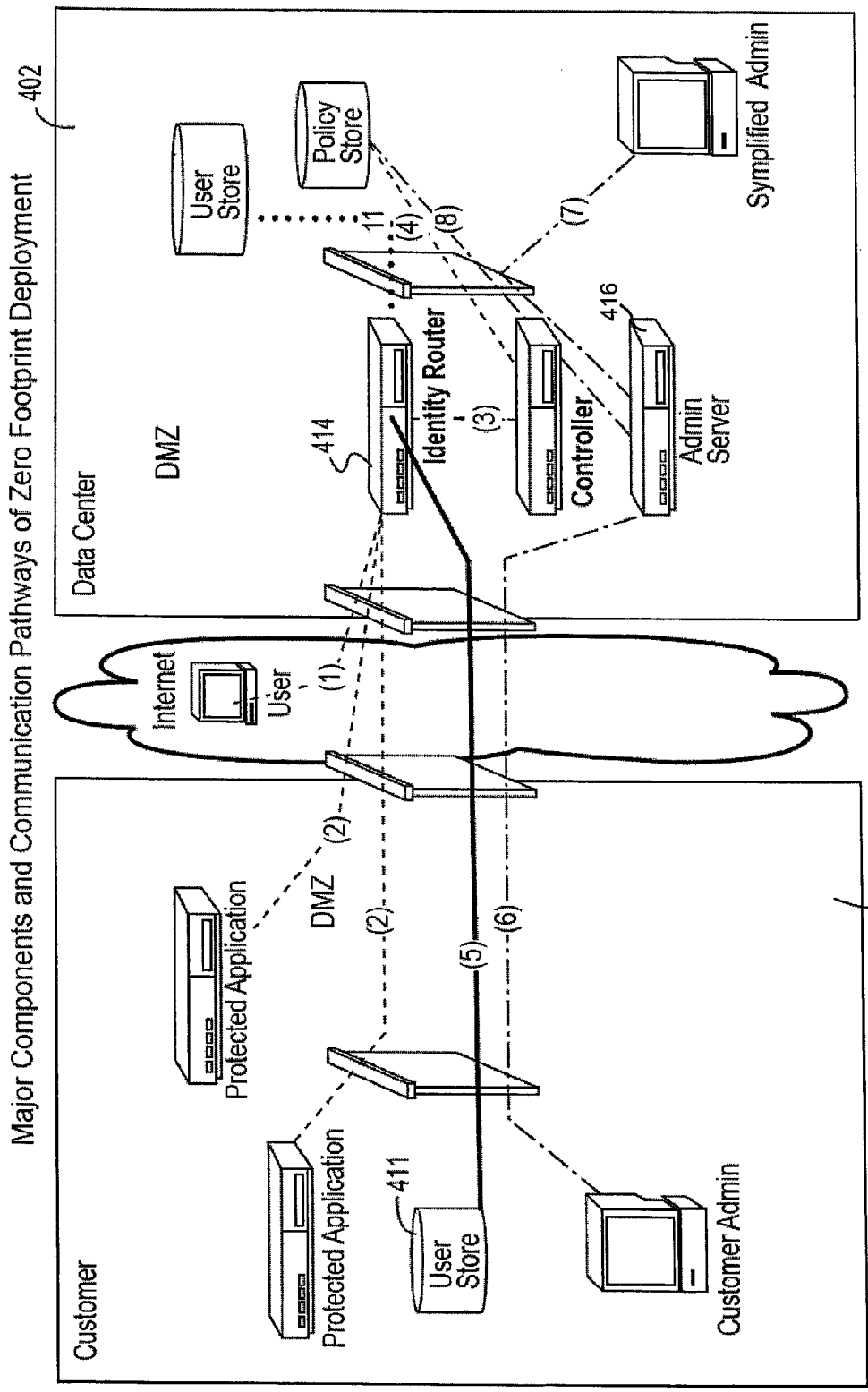
FIG. 4 is a schematic representation of an exemplary arrangement of components and communication pathways in accordance with another embodiment.

Referring next to FIG. 4, shown is a representation of components and communication pathways in an exemplary embodiment in which an identity router 414 is deployed remotely from the customer's data center 406 so as to provide a "zero footprint" deployment of identity-management-related services to the customer 406.

As depicted, the components and communication paths in this embodiment are substantially the same as the embodiment described with reference to FIG. 3 except that the data center 402 will filter out requests for resources (e.g., web applications) before the requests get to the customer's network. In particular, the identity router 414 is hosted by the data center 402 so that the customer 406 does not install anything; instead, the customer 406 simply points their public DNS entries for the protected application domains to the identity router 414 at the data center 402 so that user-requests are routed to the data center 402. Thus, in this embodiment a customer is able to access, from a single location, unified identity management services by simply subscribing to a service provided by the data center 402. And in some variations, the data center 402 may also host the customer's user data store 411 (or a replica of it) so the identity router 414 need not access the customers data store via the network (Path 11).

Figure 5A:
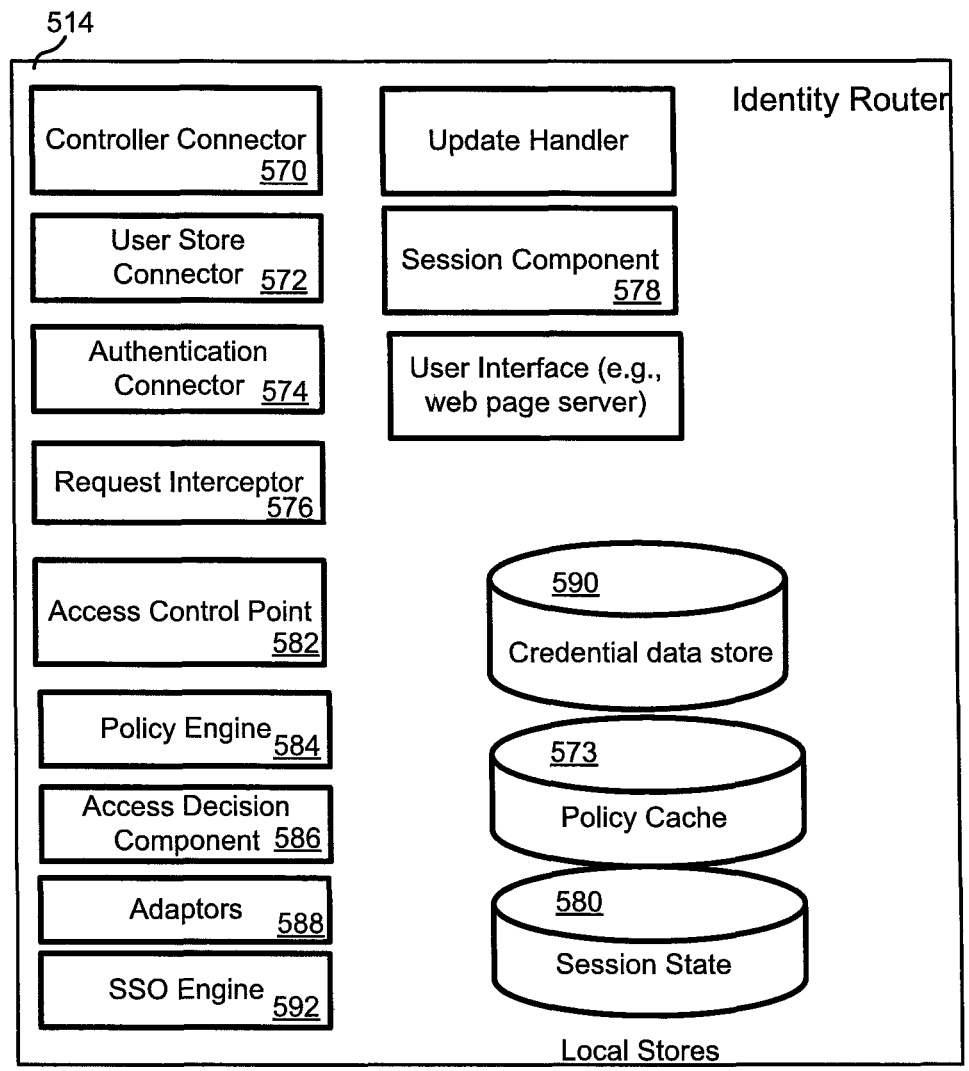
FIG. 5A is a block diagram depicting components that may be included in an identity router in accordance with an exemplary embodiment.

Referring next to FIG. 5A, it is a block diagram depicting components that may be included in an identity router in accordance with an exemplary embodiment. It should be recognized that the illustrated components in FIG. 5A are logical, and that FIG. 5A is not meant to be an actual hardware diagram. Thus, many of the components can be combined or further separated in an actual implementation. Moreover, it should be recognized that the identity router 514 depicted in FIG. 5A is merely exemplary of one embodiment, and identity routers in other embodiments include fewer functional components than are depicted in FIG. 5A. Similarly, it is certainly contemplated that identity routers may be implemented with additional functional aspects.

As one of ordinary skill in the art will appreciate in light of this specification, the depicted components may be realized by hardware, software, firmware, or a combination thereof. Moreover, in light of this specification, the manufacture and use of the depicted components is well within the skill level of one of ordinary skill in the art.

As shown, the identity router 514 in this embodiment includes a controller connector 570 configured to enable the identity router 514 to receive policies and updates that may be pushed to the identity router 514 from a remote controller (e.g., controller 118).

The policy cache 573 is a repository for policies received by the controller connector. Referring briefly to FIG. 5C, shown is exemplary content that may be included in the policy cache 573. As depicted, the policy cache 573 may include, for each of N resources, N policies (e.g., one or more policies for each resource), and each policy may include one or more rules that define whether a user may access the resource. As shown for example, each rule may be defined in terms of a user attribute, a comparison term, a value for the user attribute, and an action to be carried out based upon the rule.

For example, a rule for a particular resource may require that the user's role be that of an engineer before access to the resource is permitted, or a rule for the resource may deny access to the same resource if the user's status is not that of an employee. The remote PCA database (e.g., PCA database 120) may also include the same or similar content and structure of the policy cache depicted in FIG. 5C, but in many implementations, the PCA data base includes policy information for N customers (one or more customer), and as a consequence, the PCA database may also include customer data in connection with the policy data.

The policy cache 573 may be populated by receiving policies (e.g., stored remotely in a PCA database) that are served up from the remotely located admin servers 116, 216, 316, 416 as described previously with reference to FIGS. 1-4. For example, an administrator of a customer may prompt policies to be pushed to the policy cache 573, and in other embodiments new policies may automatically be pushed to the policy cache 573, and in yet other embodiments, the transmission of new/revised policies may be triggered by an event (e.g., a time event or work flow event such as an approval of a policy that is made by personnel of the customer).

Also depicted is a user store connector 572, which is generally configured to connect to one or more user stores, e.g. from a user store at a customer's location (e.g., user store 111 or a remote user store) to retrieve attributes. For example, the user store may be an LDAP directory that is utilized by a customer in connection with email functions at the user's location.

Referring briefly to FIG. 5D, shown is exemplary content that may reside in a user store. As depicted, a user store may include, for each of N users, attribute fields (e.g., the department a user works within, the functional role of the user, the employment status of the user, etc.). And within each attribute field a value may be included to indicate the value of each attribute for each user.

The authentication connector 574 functions to authenticate credentials and/or retrieve credentials that may be used to authenticate a user (e.g., a person or system). In some embodiments, the authentication connector 574 communicates with an authentication subsystem (e.g., authentication subsystem 119 described with reference to FIG. 1) and also presents a user interface and/or communicates with the user's client. In one embodiment for example, the authentication connector 574 presents a form to the user so that the user may enter credentials that the authentication connector 574 may pass to the authentication subsystem.

In another embodiment, the authentication connector 574 may challenge the user's client (e.g., a web browser) for credentials (e.g., Windows NT LAN Manager (NTLM) token, HTTP cookie, or digital certificate) that the authentication connector 574 may pass to the authentication subsystem. The authentication connector is also capable of interpreting whether the authentication was successful.

The request interceptor 576 is generally configured to receive requests from users to access resources (e.g., applications) and facilitate interaction with a user as described further below. And the session component 578, is configured to detect whether an SSO session has been established, and if so, retrieve SSO session data from the session state store 580. If not, then the session component 578 is configured to initiate an SSO session by triggering authentication with the authentication connector 574, and upon receipt of a message indicating successful authentication, establish an SSO session. In some variations, the session component 578 also retrieves the states of sessions (also referred to herein as application-sessions) from the session state store 580 that the adaptor and SSO engine have created for applications.

The access control point 582 is disposed and configured, responsive to the request received by the request interceptor 576, to communicate with the policy engine 584 or to the session component 578 to determine how the request should be handled.

And the policy engine 584 is configured in some embodiments to look at actual requests from users (e.g., in real time), and as a function of one or more rules and attributes, allow or deny the requests. In other embodiments the policy engine 584 is configured to assess potential requests (e.g., with regard to resources that could be requested and/or configured with respect to the policy cache 573) and to provide an output (e.g., entitlement data that identifies one or more resources that a user/system may access), as a function of one or more rules and attributes (e.g., from local and/or remote user store), indicating whether the user should be allowed or denied access in the event each request is made.

The access decision component 586 is generally configured to receive requests (e.g., from the access control point) relating to users and resources and determine if the resource is an entitlement for that user. In one embodiment for example, the access decision component 586 may retrieve entitlements from the session state store 580, and in another embodiment, the access decision component 586 may invoke the policy engine 584 for a real-time access control decision.

Also shown is an adaptor portion 588 including a plurality of adaptors (e.g., each adaptor may correspond to an available resource), and is configured to receive a credential set from the credential data store 590, and utilizing information from the credential set, communicate with the resource corresponding to the received credential set to authenticate the user to the application.

Figure 5B:
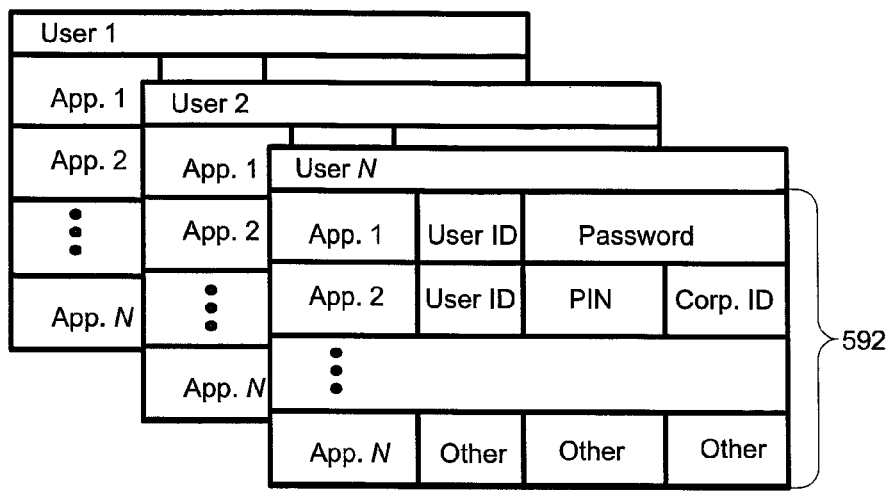
FIG. 5B depicts exemplary content that may reside in the credential store depicted in FIG. 5A.
Figure 5C:
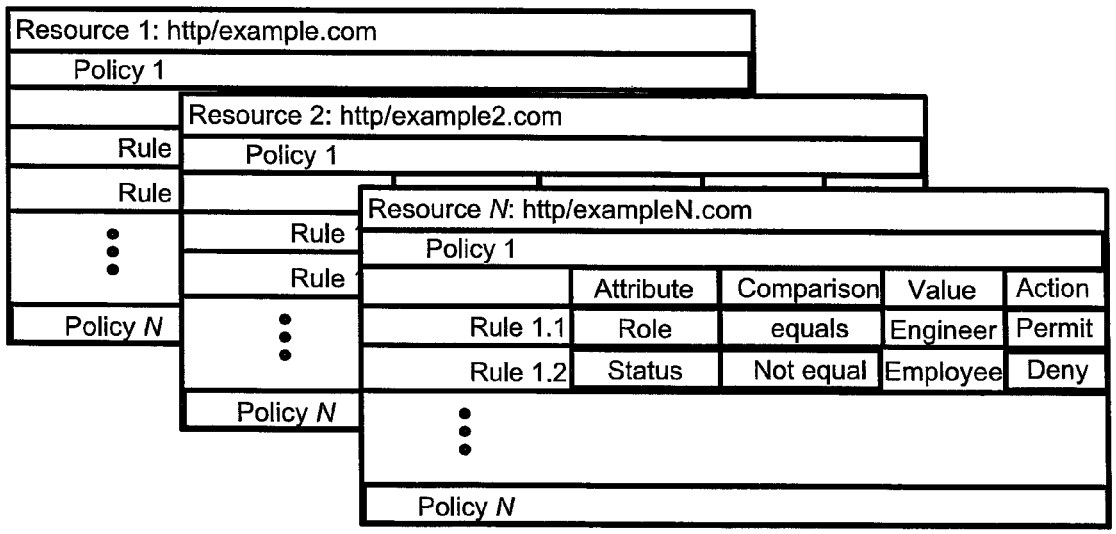
FIG. 5C depicts exemplary content that may reside in the policy cache depicted in FIG. 5A.

Referring briefly to FIG. 5B, shown is exemplary content that may be included in the credential store 590. As depicted, the credential store 590 may include, for each of N users, N credential sets 592 for N resources (e.g., applications). As shown, the information contained within each credential set may (but not necessarily) differ for each resource and may include information that identifies the user and information that the user retains as a secret (e.g., password and PINs).

The credential user store 590 may be populated in one or more ways. For example, a user may be given access to provide and edit credentials at anytime (e.g., in advance of the user requesting to access a resource). In addition, if there are no credentials yet in the credential store (e.g., for the user or the resource the user requests to access), an adaptor may prompt a user at the time of the request for credentials. In some implementations an administrator may establish credentials for a user, and in yet other variations, the identity router may generate credentials for the user. These credentials may be stored in advance of a user requesting access to a resource or after the identity router has been deployed and used.

The SSO engine 592 generally operates to receive requests from the request interceptor 576 (e.g., requests including SSO session data and resource information (e.g., a URL)), and if the user has not been authenticated to the resource (e.g., the session component 578 indicates there is no valid application session for this user and application) and authentication is required, then the SSO engine retrieves a credential set corresponding to the resource and user from the credential store 590 and sends the credentials to an adaptor in the adaptor portion 588 (e.g., the adaptor corresponding to the resource) so that the adaptor can authenticate the user to the resource, and create an application session.

In many embodiments, an initial user request is carried out through the identity router 514 to enable the request interceptor 576 to intercept user requests. In many embodiments that enable access control to resources, all user requests are carried out through the identity router 514. From a network level perspective, in some embodiments, the request interceptor 576 on the identity router functions as a bridge (e.g., working at layer 2 of the OSI model).

In other embodiments, the request interceptor 576 functions as a proxy. For example it may function as an HTTP proxy, and for each resource, a user will request a proxy address that differs from the actual address of the resource. It is also contemplated that other types of proxies may be utilized such as FTP proxy, other existing proxies, or yet-to-be-developed proxies.

In operation, when a user (e.g., system, remote user, or local user) requests access to a resource, the request interceptor 576 receives the request, and calls to the session component 578, which establishes whether an SSO session has been established for the user, whether the session is valid, whether the session has timed-out, and if the user does not have a valid, current session, then SSO authentication is initiated. In one exemplary embodiment, the request interceptor 576, working with the session component 578, attempts to retrieve an SSO session token that represents an assertion that this user has previously authenticated to the authentication subsystem through the authentication connector 574.

In many implementations, there are multiple ways in which the SSO authentication may be achieved, and the particular methods that are utilized for carrying out the SSO authentication may be selected based upon one or more conditions (e.g., the particular requested resource, the IP address of the user's browser, the type of browser, and/or location of user). In some embodiments, more than one authentication subsystem will be consulted, with failed authentication from one system acting as a trigger to attempt authentication with the next. In still other embodiments, the user may select a type of authentication which will influence or determine the method for SSO authentication.

In one embodiment, SSO authentication is carried out by the authentication connector 574 presenting a form for the user to enter an ID and password. In other embodiments, the form requests other information the user knows (e.g., corporate ID, shared secrets), and in other implementations, in combination with a form (or instead of a form), something a user has (e.g., hardware token, smart card, and/or certificate residing on a local or remote storage media) or something the user is (e.g., a biometric attribute) are utilized. The authentication connector 574 then presents the received credentials to an appropriate authentication subsystem.

In some embodiments the authentication subsystem (e.g., the authentication subsystem 119) is simply a user store (such as LDAP) that can validate an ID and password and return a result that indicates whether the credentials are valid for the user. In another embodiment, credentials are simply attributes that are retrieved from a user store (such as a database) and the authentication connector 574 determines if the retrieved credentials match those provided by the user.

In an alternative embodiment, the authentication subsystem (e.g., the authentication subsystem 119) is a Windows Domain Controller and the identity router 514 engages the user's web browser in Windows Authentication NTLM Challenge, which after a series of challenges and responses, may validate the user.

In other embodiments, the authentication subsystem (e.g., the authentication subsystem 119) can be third party software or systems that interact with the identity router 514 and/or present user interfaces for users to respond to prompts for information the user knows.

Still other embodiments will employ interfaces to a software client that allows the authentication subsystem (e.g., the authentication subsystem 119) to receive data that represents something the user has (e.g., hardware token, smart card, and/or certificate residing on a local or remote storage media) or something the user is (e.g., a biometric attribute). In still other embodiments, a plurality of authentication subsystems may be employed, including software logic that uses characteristics of the request to determine which authentication subsystem to use, for example, the specific request from the user, the origin of the request, initial challenges to the user or client, or the results of authentication attempts with other authentication subsystems.

Once SSO authentication is successful, in the exemplary embodiment, the session component 578 generates a token that represents an assertion of the successful authentication that just occurred. In some embodiments the token is merely a unique identifier that serves as an index or key that the session component 578 uses in order to retrieve session data that contains information such as session timeout, user/system identity, attributes of the user, and/or entitlements.

In other embodiments, the session token encodes all or part of the information that includes session timeout, user/system identity, attributes of the user, and/or entitlements. The session token is provided to the software client of the user in a way that it can be subsequently presented to the request interceptor 576. In one exemplary embodiment the session token is an HTTP cookie. In still other embodiments it is a data structure that can be saved and returned to the request interceptor 576 through an appropriate protocol.

In some embodiments, when a user is unable to authenticate successfully, the user interface presents an error message to the user. In other embodiments, the user may be prompted for additional attempts to authenticate.

Once the session component 578 establishes a valid session for a user, it may use various means to invalidate the session, thus triggering repetition of the above steps when subsequent requests are intercepted. For example, embodiments may employ session timeout intervals after which a session is invalidated. Some implementations may also employ inactivity timeouts wherein the session expires if certain kinds of activity (e.g., resource requests) do not occur in a prescribed time period. And embodiments may also present a user interface that allows the user to log out and effectively force the invalidation of their session.

In operation, in some embodiments, when a user requests a resource, and has a valid session, the request interceptor 576 invokes the access control point (ACP) 582 which in turn invokes the access decision component 586 to evaluate the session data from the session component 578 and determine if the user is allowed to access the resource. In many implementations, the user is only allowed to access the resource if a rule of a policy in the policy cache 573 applies to the requested resource, and the user is found by the policy engine 584 to have permission to access that resource. In some embodiments, various rules are applied in combination to determine whether the user is granted access.

In some embodiments, the initial authentication triggers evaluation of all policies and rules that apply to resources referenced in the policy cache 573. In this case, a list of entitlements is generated and subsequently available for retrieval by the session component. When the access decision component 586 needs to determine if the user is allowed access to a resource, the list of entitlements is matched against the requested resource and if there is a match, the user is permitted access.

In other embodiments, a real time evaluation is performed, wherein the access decision component 586 determines if a user is allowed access to a resource by invoking the policy engine 584, passing it attributes that are retrieved from the user store connector 572 and one or more user stores.

In some embodiments, an inactivity timeout is managed for sessions, and a request triggers update of session information (session token and/or session state 580).

If the access decision component 586 determines that the user should be permitted access to the requested resource, it informs the ACP 582 which in turn will grant access. In some embodiments this allows the request interceptor 576 to pass network traffic corresponding to the original request. In other embodiments, the identity router 514 acts as a proxy device and forwards traffic with appropriate translation of request addresses and response addresses.

In some embodiments, when a user is denied access, the user interface presents an error message to the user.

Figure 6:
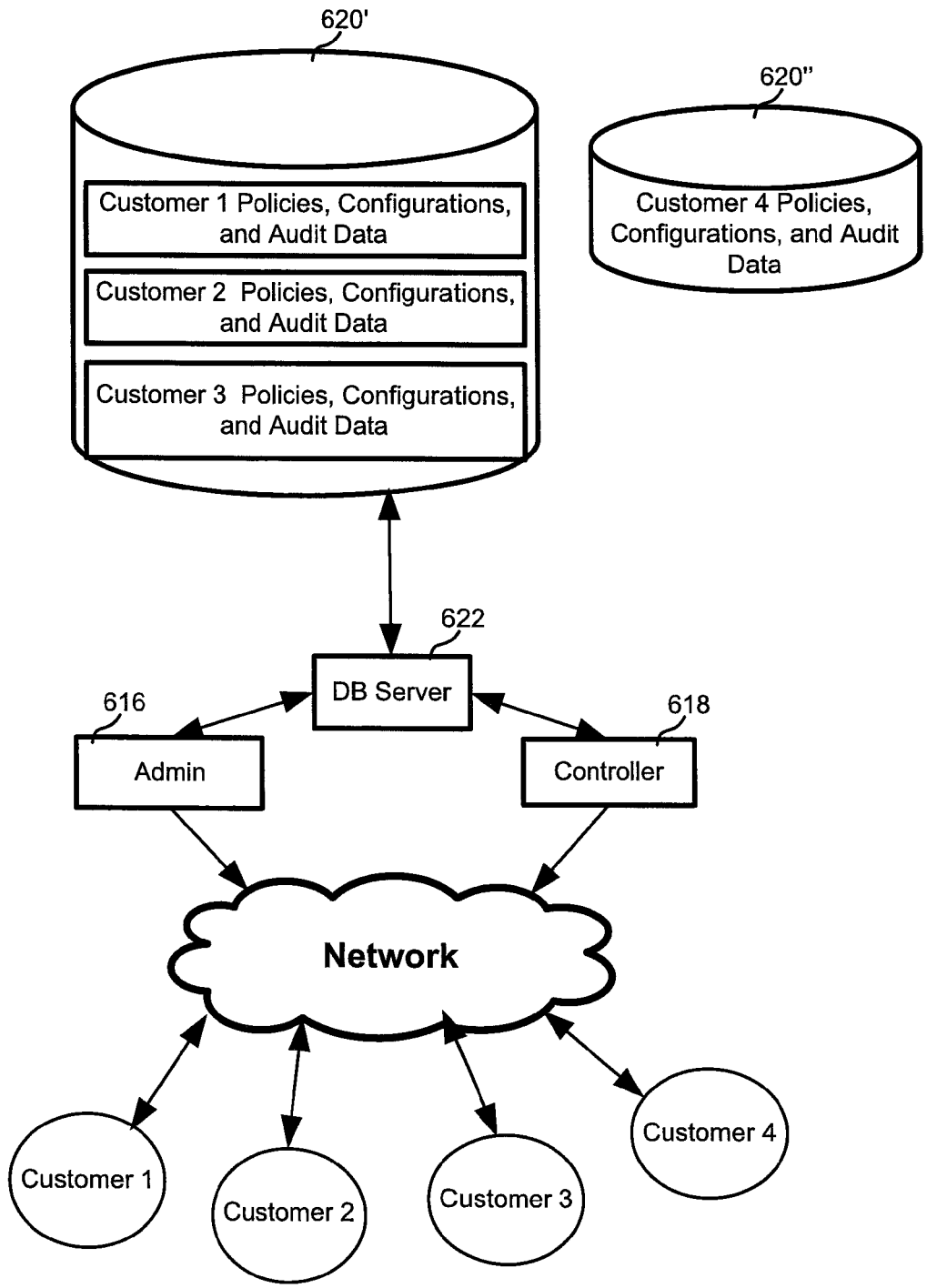
FIG. 6 is a block diagram representing an exemplary embodiment utilizing multi-tenancy technology, which may be used in connection with any of the embodiments described herein.

Referring next to FIG. 6, shown is a block diagram representing an exemplary embodiment, which may be used in connection with any of the embodiments described herein. In this embodiment, multi-tenancy technology is utilized in connection with the identity-related-management services previously described. As depicted one collection of infrastructure components (e.g., the PCA database/server 622, admin server 616, and controller 618) are utilized to provide security and identity services to a variety of disparate customers.

As shown, data associated with customer 1, customer 2 and customer 3 are inside one PCA data store 620' and the customers all share the same set of servers. In other words, one instance works for all three of the customers instead of a separate instance for each customer. As a consequence, this architecture enables the data center to be easily scaled. Hybrid solutions are also contemplated. As depicted for example, customer 4 shares the same infrastructure (e.g. admin 616 and controller 618 Servers) with the other three customers, but the data for customer 4 may be stored separately (e.g., in a separate physical data store 620") from data associated with the other customers.

Figure 7:
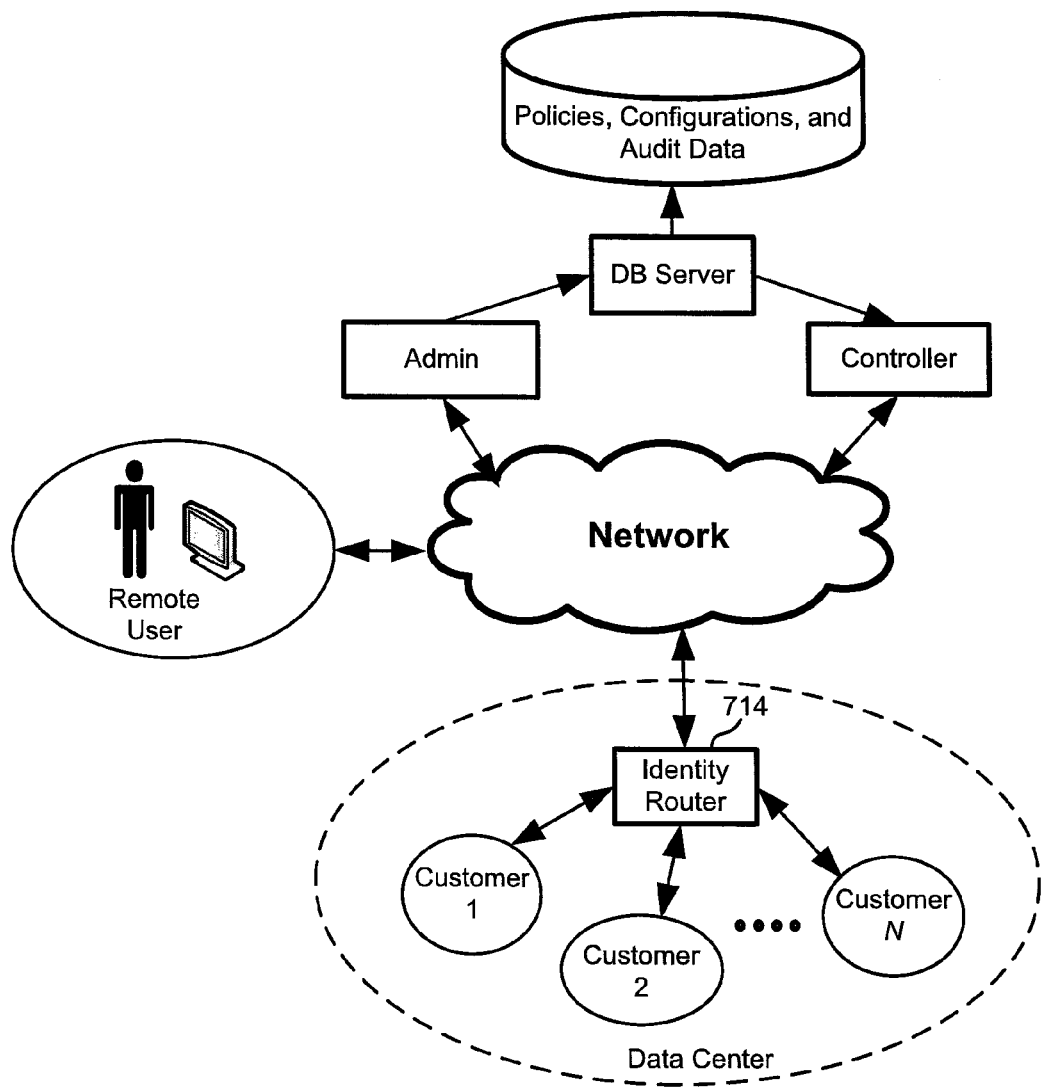
FIG. 7 is a block diagram depicting an embodiment in which an identity router is configured and disposed to protect multiple customers.

Referring next to FIG. 7, shown is a block diagram depicting an embodiment in which one identity router 714 is configured and disposed to protect multiple customers. In this embodiment, one identity router 714 may be placed in a rack of a data center (e.g., a data center maintained and operated by a third party) and several customers within that data center use the identity router to protect their resources. For example, each customer may have one or more web servers that need to be protected, and the single identity router 714 may be utilized to protect all the customers. It is also contemplated that a data center company managing the data center may take advantage of the on-demand identity-related-services that the data center can provide, and simply "resell" the services to their customers.

Figure 8:
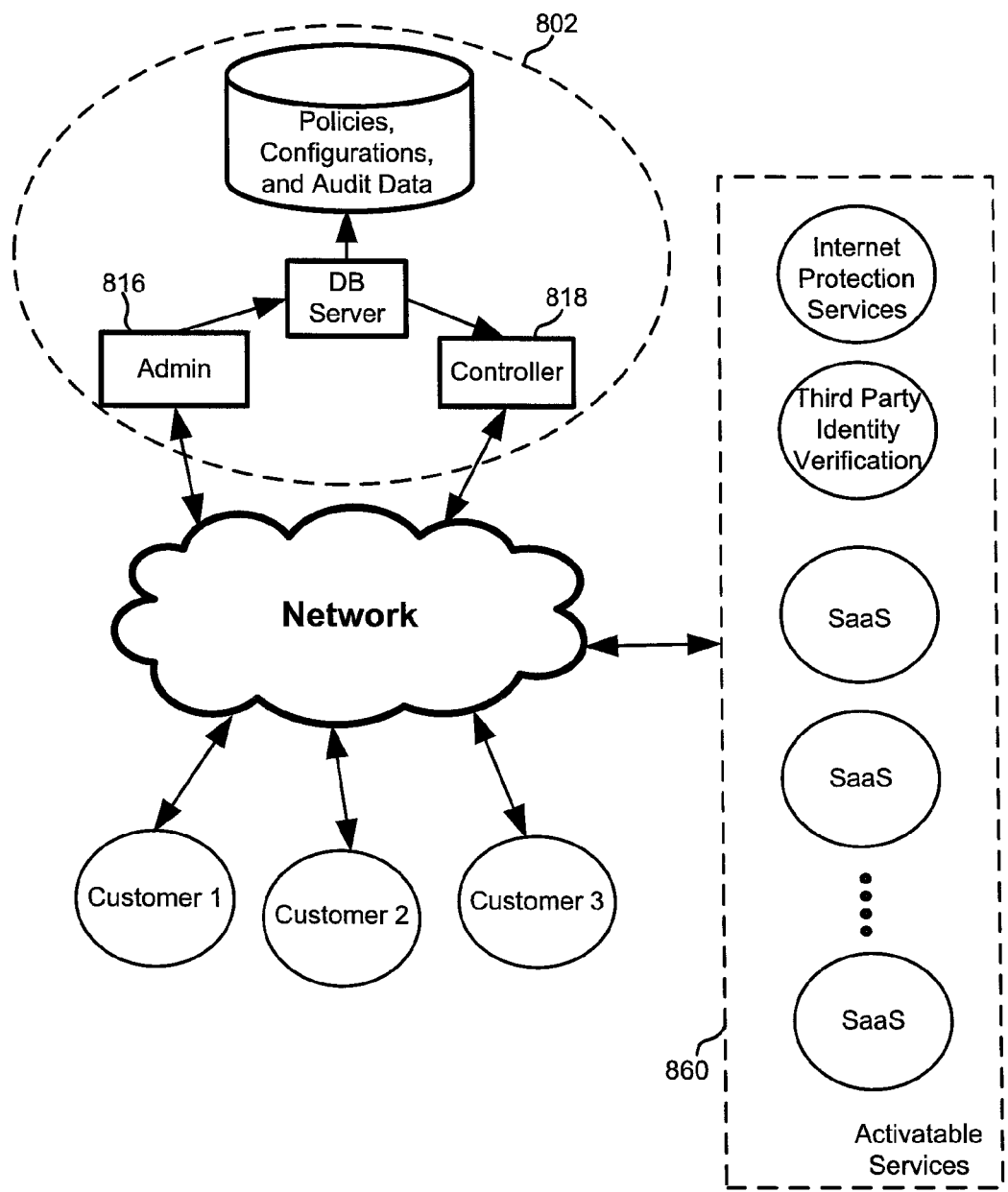
FIG. 8 is a block diagram depicting a plurality of services available through an exemplary embodiment of a single point sign-on network.

Referring next to FIG. 8, shown is a block diagram depicting a plurality of services 860 available through a single point sign-on network. As shown, customers of the data center 802 in this embodiment are able to receive, via SSO, one or more activatable services by simply requesting that the data center 802 activate the service(s).

Although each customer depicted in FIG. 8 could potentially negotiate with one or more of the depicted service providers (e.g., SasS providers) to receive single sign-on for each of their users, the time and resources required to do so would likely pose an insurmountable barrier to all but the larger, more sophisticated businesses that have a full, dedicated IT staff available. For example, a customer desiring to establish a relationship with any one of the service providers would have to obtain software that communicates in accordance with the protocol (e.g., SAML) utilized by the service provider.

That customer would then have to work with the individual service provider to configure the software, establish communications with the service provider, and then coordinate with potentially overworked personnel at the service provider just to send user identities to the service provider. And once the technological hurdles are cleared, the customer would have to engage in legal negotiations with the service provider to outline each party's responsibilities, contingencies, remedies etc. Moreover, as technology changes, the customer would have to manage any changes relative to each service provider to ensure they are able to continue to receive the services.

Although there are businesses that do offer an adapter that helps enable a customer to connect with SaaS companies (e.g., by helping the customer to build their own connection with varying degrees of capability), these tools do not help with legal agreements, and do not help with the coordination of implementation. And importantly, these tools may do the sign on, but they do not synchronize identities.

In contrast, the embodiment depicted in FIG. 8 provides a network that is pre-integrated with services that may be activated by each customer on demand. So, few if any technical skills are required, and there is no legal wrangling. Instead, each customer interacts with the data center 802 by way of simple security assurances (e.g., public key infrastructure (PKI) certificate), and legal issues may be disposed of by way of a click wrap end user license agreement (EULA) provided by the service provider. And as technology changes, the data center 802 is positioned to incorporate the changes into their system because that is a key component of the data center 802 business.

But aside from enabling single sign-on for each of the customers, the data center 802 is also configured to synchronize identities, implement access control, authorization, auditing, and reporting for all the transactions between each customer and each of the activatable services.

And once a customer has activated a service, a user of the customer will have SSO through an identity router (e.g. identity router, 114, 214, 314, 414, 514, 714) to the activated service (e.g., one or more SaaS sites). The identity router authenticates the user (e.g., by checking a cookie maintained in the user's browser) and if the policies allow the user to logon, then using one or more mechanisms (e.g., proprietary and industry standard (e.g., SAML, SPML) mechanisms) the identity router synchronizes and provides SSO so the user can access the activated service.

As shown, a variety of activatable services may be integrated with each customer. Internet protection services, for example, may be provided to customers in the form of an IP black list. It is contemplated, for example, that the data center may track potentially malicious behavior across customers, partners and SaaS providers and provide this type of information to customers.

Another valuable service that may be integrated with the SSO services provided by the data center 802 is an identity verification service. For example, a customer that is engaged in ecommerce may subscribe to an identity verification service that provides live data-proofing. As an example, the customer may receive information from a user (e.g., a third party user), and the customer places the third party user information on the data center network bus (e.g., a secured trusted connection). The admin server 816 then accesses the identity verification service and attempts to verify the information. And in response, the identity verification service may provide a couple questions to ask the user, and these questions are pushed by controller 818 to the identity router and then presented to the customer. The answers are then provided back to the admin server 816, which provides the answers to the identity verification service for final verification; thus enabling the customer to reduce the likelihood of fraudulent activity.

Figure 9:
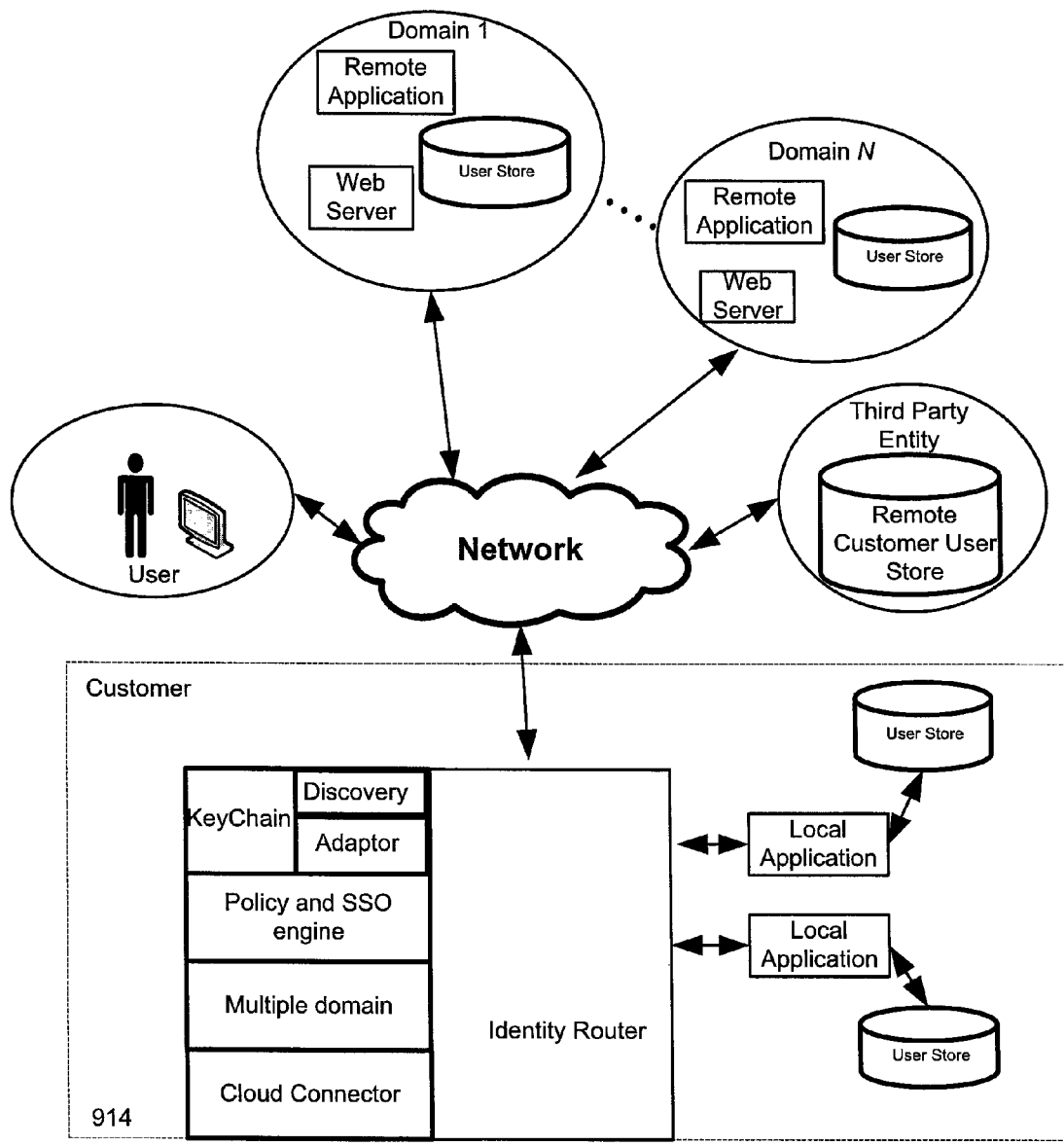
FIG. 9 is a block diagram depicting an exemplary environment in which several embodiments of the invention may be implemented.

Referring next to FIG. 9, it is a block diagram depicting an exemplary environment in which several embodiments of the invention may be implemented. And in particular, FIG. 9 depicts functional components that may be implemented in one or more embodiments of the identity routers (IRs) 114, 214, 314, 414, 514, 714 described herein. The specific functional components depicted in the identity router 914 are not shown in connection with other functional components previously described for purposes of clarity only, but it should be recognized that the functional components of the identity router 914 depicted in FIG. 9 may be combined with other functional components described herein. Moreover, one or more of the functional components depicted may be omitted from some embodiments (e.g., one or more of the depicted functional components may be separately selected on a subscription basis).

It should also be recognized that the illustrated arrangement of components within the identity router of FIG. 9 is logical, it is not meant to be an actual hardware diagram. Thus, many of the components can be combined or further separated in an actual implementation, and may be realized by hardware, software, firmware, data storage components and combinations thereof. For example, the policy and SSO engine generally represents functions that may be enabled within the identity router as previously described with more detail (e.g., with reference to FIGS. 1-8) that may be realized by several components (e.g., hardware, software, firmware, and/or combinations thereof). In addition, the identity router in the exemplary embodiment depicted in FIG. 9 is shown at a customer's location, but this is certainly not required, and as discussed throughout this specification, the identity router may also be located a data center (e.g., the data center described with reference to FIG. 1).

As shown, the identity router in this embodiment includes the policy and SSO engine, which generally provides, in connection with a data center (e.g., the data centers discussed with reference to FIGS. 1-4, and 6-8) the implementation and enforcement of access management (e.g., authentication and authorization services) with the SSO functionality previously discussed herein.

In some embodiments, the identity router can interact with a resource in order to programmatically change user passwords. For example, APIs of resources may be called and/or the identity router may stuff forms of the resources.

Also depicted is a keychain module, which is generally configured to facilitate authentication of users to applications (e.g., the applications that are available locally at the customer's location and those located remotely (e.g., web applications accessible at remote domains$_{1-N}$ via the network)). In some implementations, the keychain module includes a credential data store (e.g., the credential data store described with reference to FIG. 5).

In many implementations, one or more of the local and remote applications depicted in FIG. 9 are not designed to operate with third party authentication components. For example, many commercial off the shelf (COTS) applications (e.g., SAP) have their own user store and authentication mechanism built in. Historically, custom code was required to bridge the gap between access management functions provided and applications. Many variations of the keychain module in this embodiment enable customers to employ the identity router without onerous customer coding; thus the keychain module allows integration while saving time and money and it is easily upgraded.

In many variations, the keychain module, seamlessly to the end user, will authenticate users to applications using an application's existing authentication mechanisms. For example, the identity router may request the resource on the user's behalf and the application then returns an authentication form, which the identity router will populate with the user's credentials, so that the identity router does the authentication on behalf of the user.

As depicted in FIG. 9, an adaptor portion of the keychain module is configured to both accommodate multiple protocols and multiple authentication mechanisms. For example, the adaptor portion is configured to generate adaptors that accommodate the protocols of applications on the customer's network (e.g., commercial off-the-shelf (COTS) applications that have their own login), and/or applications in "the cloud" when the customer desires single sign-on functionality for applications that are in the cloud.

In the context of applications on the customer's network, the adaptor portion may simply stuff forms of the local applications, but in the context of remote applications accessible via the network, other protocols (e.g., SAML or other federation protocols) are accommodated (e.g., the adaptor portion abstracts away the differences in protocols and APIs to allow single sign-on with remote domains).

In many variations, the keychain module also includes a user store that includes data that defines name-space mapping between user stores (e.g., between user stores of the customer and user stores of the remote domains$_{1-N}$ and the third party entity). The name-space mapping provides the ability to store a user's entire identity across all the places the user goes and map identities to the personas that are used at each place.

The discovery portion generally is a tool to learn about how to interact with and adapt to an application. It may use a variety of mechanisms to simulate an end user on a browser interacting with a website. For example, it may access a web site and discover form elements that it is pointed to. In addition, it may send in information, e.g., a cookie, with the first entry of the login page before the actual form that requests a password is served up and it may provide user credentials.

More specifically, in many embodiments, the discovery portion allows administrators to "discover" an application's underlying authentication mechanism and returns a configuration that describes the authentication mechanism that may be used to accomplish authentication for that application.

In one variation for example, the discovery portion takes an application URL and attempts to discover the type of application being used and to construct a configuration which can be used by the identity router to accomplish authentication (as described herein) for that application. In many implementations, the discovery portion calls out to all Spring registered authentication handlers. The following authentication handlers are exemplary of the authentication handlers that may be supported, but it is certainly contemplated that other authentication handlers may be supported as well:

HTTP Basic—HTTP Basic is a coarse grained authentication mechanism that is not utilized as often as other mechanisms because it transmits a username and password in clear text, so is considered relatively unsecure.

HTTP Digest—HTTP Digest is similar to HTTP Basic but does encrypt or hash the password so is more secure.

Form Based—Form based authentication is typical of most web-based enterprise and Saas products, and unlike HTTP Basic and Digest, follows no specific specification. This type of authentication takes the security credentials (e.g., username and password) from a "login" page and uses it to authenticate the user against some backend database or LDAP server. If authenticated, the web server will drop a cookie that indicates that the user has been authenticated and redirects the user to a home page. Because form-based authentication follows no specification, it is the more difficult to configure of the three exemplary handlers discussed here.

Both HTTP Basic and Digest may be layered on top of an existing static web site via web server administration tools. Because of this, it is relatively easy to turn off this type of security and simply allow the identity router in connection with an data center to manage all authentication/authorization for that application.

It is also contemplated that an NTLM authentication handler may be utilized as well. This type of authentication is distinct from the other identified handlers because it introduces the notion of connection state in mod-singlepoint. This type of handler may also be registered as an authentication handler with the SSO service.

Both HTTP and HTTPS URLs may be supported, and it is contemplated that other protocols may be supported as well. The handlers may have a very "liberal" SSL socket handler allowing ANY cert to be permitted for SSL communications.

In operation, the discovery portion may cycle through Spring registered authentication handlers (e.g., calling their discover method) until one returns an authentication configuration. In some implementations, the only argument for discovery is an URL for the application, which may be any URL, but it may be more efficient for the URL to be either the home page or login page if form-based authentication is suspected.

In the context of HTTP Basic and Digest discovery, when a request is made to a server that uses HTTP authentication, it responds with a 401 "Unauthorized" code. That response contains the "WWW-Authenticate" header which indicates the authentication scheme that the server expects (e.g., Basic, Digest, NTLM, or other scheme).

In many embodiments form based discovery is utilized, and may include the following steps:

Retrieve Login Page—The input URL is used to retrieve the login page. If this URL is the login page it is fetched directly, otherwise the handler will follow redirects until a login page is presented. The request for the URL uses the default request headers specified in the ssoService.xml file.

Parse Login Page—The login page is parsed to identify all forms and input fields on the page. Furthermore the input fields are classified as either USER, PASSWORD, SUBMIT or OTHER based on the matchers specified in the ssoService.xml file. This information is used to construct an authentication configuration.

Attempt Failed Login—The authentication configuration is used to attempt a failed login (see authentication below). The username and password are generated by taking the first 10 characters of a two randomly generated UUIDs.

Identify Failure—The response returned from the failed login attempt will contain an HTTP status, redirect URL and page content. This information is used to identify what constitutes failure for a login. If the HTTP status returned as SC_UNAUTHORIZED it will be used as the indication of failure, otherwise if the redirect URL matches on the URL matches in the ssoService.xml file it will be used. Finally, if neither of these matches, the redirect URL's HTML content will be parsed for "visible" text and will be matched against the matchers in the ssoService.xml file. If a match occurs it is added to the configuration as the failure test.

The form-based handler may return an authentication configuration even if it fails to adequately identify a failure page or the username/password input fields. Because of this, the form-based authentication handler config may be placed in the ssoService.xml file as the last handler so that discovery for handlers falling after it will be called.

Authentication is called from the policy and SSO engine during authorization when the application associated with the URL being authorized is associated with an application type that has an authentication config. Once the policy and SSO engine has determined that the user is authorized for the application, it will take the username, password, associated authN config and request information and call the SSO service's authenticate method. The policy and SSO engine uses the authentication configuration to determine the appropriate authentication handler to use for the authentication. And once authentication has succeeded, the request/response cookies returned by the SSO service will be passed to a mod-singlepoint system. The authentication for specific handlers are described below.

In the context of HTTP basic, authentication may be carried out by setting an authorization header in the HTTP requests sent to the server. The header may include the username and password in a base 64 encoded format. In many implementations, the same information is sent via the header each time, so it isn't necessary to reset this header at any point. More details regarding HTTP basic authentication can be found, for example, at the "Wikipedia" on-line encyclopedia.

In the context of HTTP Digest, the authorization header may be created using information from the server. More details regarding HTTP digest access authentication can, for example, be found at the "Wikipedia" on-line encyclopedia. An example of such details is as follows:

- Initially the challenge header is obtained from the server. This header basically describes the type of authentication and provides the nonce to be used to encode the response.
- The nonce and the other pertinent information are then utilized to create the Authorization header; and
- That header is stuffed into the response, and any subsequent requests to the server will be accepted.

With respect to form-based authentication, the following steps may be carried out:

- Retrieve Login Page—The login URL specified in the authentication config is used to retrieve the HTML for the login page. This request will follow all redirects until the page is found. The request headers from the original user request are used when retrieving this page.
- Construct Login Parameter List—The HTML from the login page is parsed and the login input fields are identified. The authentication config's input objects are used to construct a list of name/value pairs that will be used for login. Based on the config the values may be used from the form itself, typically hidden fields, or from the config.
- Add Config Cookies—If the config contains cookies that should be added to the request they are added.
- Do Login—The action URL from the config is used to perform the login using the parameter list and request information. The login request is followed through all redirects to either a failed login page or the page specified by the original request. As redirects are followed both request and response cookies are gathered.
- Identify Success/Failure—The HTML from the result of the login request is parsed and the config's failure test is used to identify whether the page constitutes a failure page or not. If the page is a failure, authentication will fail otherwise the page is considered a successful login.
- Return Result—The result and any request/response headers are returned to the caller.

Relative to configuration, SSO authentication handlers may be configured in an xml configuration file (e.g., a Spring configuration file named ssoService.xml), and configuration options for each handler type are described below:

HTTP basic and digest may be handled by an HttpAuthenticationHandler which has the following configuration options:

| PROPERTY | TYPE | DEFAULT | COMMENT |
| --- | --- | --- | --- |
| checkForStaleConnections | BOOLEAN | true | Determines whether check for stale socket connections before request. |
| tcpNoDelay | BOOLEAN | false | Determines whether data should be buffered before sending. |
| maxConnections | INTEGER | 100 | Determines max connection pool size. |
| maxConnectionsPerHost | INTEGER | 10 | Determines max connections per host. |
| socketBufferSize | INTEGER | 10240 | Size of socket buffer in bytes. |
| socketTimeout | INTEGER | 20000 | Milliseconds to wait before timing out a socket request. |
| connectionCheckoutTimeout | INTEGER | 10000 | Milliseconds to wait before timing out a socket checkout from pool. |

Form-based authentication may be handled by the FormAuthenticationHandler which has the following configuration options:

| PROPERTY | TYPE | DEFAULT | COMMENT |
| --- | --- | --- | --- |
| checkForStaleConnections | BOOLEAN | true | Determines whether check for stale socket connections before request. |
| tcpNoDelay | BOOLEAN | false | Determines whether data should be buffered before sending. |
| maxConnections | INTEGER | 100 | Determines max connection pool size. |
| maxConnectionsPerHost | INTEGER | 10 | Determines max connections per host. |
| socketBufferSize | INTEGER | 10240 | Size of socket buffer in bytes. |
| socketTimeout | INTEGER | 20000 | Milliseconds to wait before timing out a socket request. |
| connectionCheckoutTimeout | INTEGER | 10000 | Milliseconds to wait before timing out a socket checkout from pool. |
| cookiePolicy | STRING | compatibility | RFC 2109 Cookie Policy - use default, used for debugging. |
| contentCharset | STRING | ISO-8859-1 | Char set used to encode request content body, use default. |
| elementCharset | STRING | US-ACSII | Char set used to encode headers, use default. |
| defaultRequestHeaders | LIST | See below | Request headers to use during discovery. |

Default request headers may be described as the following:

| NAME | VALUE |
| --- | --- |
| User-Agent | Mozilla/5.0 (Macintosh; U; Intel Mac OS X; en-US; rv:1.8.1.14) Gecko/20080404 Firefox/2.0.0.14 |
| Accept | text/xml,application/xml,application/xhtml+xml,text/html;q=0.9,text/plain;q=0.8,image/png,*/*;q=0.5 |
| Accept-Language | en-us,en;q=0.5 |
| Accept-Encoding | identity |
| Accept-Charset | ISO-8859-1,utf-8;q=0.7,*;q=0.7 |

It is noted that accept-encoding should not be set to allow gzip unless socket compression/decompression is implemented in the FormAuthenticationHandler.

Supported form-based protected applications and their authentication configurations may include:

BUGZILLA

BUGZILLA server software is easily configured by doing an application discovery, and in many implementations no changes are needed to the configuration returned by discovery.

SUGARCRM

SUGARCRM customer relationship management software is easily configured by doing an application discovery, and in many implementations, no changes are needed to the configuration returned by discovery.

ZIKULA

ZIKULA application framework software may be set up with the following steps:
1. Discover and save application type.
2. Modify the type of the hidden URL input to OTHER.
3. Modify the value source to be the form.

ALFRESCO

ALFRESCO enterprise content management software may be set up with the following steps:
1. Discover and save application type.
2. Add a cookie called -alfTest with no value.

Once the identity router learns how to interact (e.g., conduct a "ceremony") with an application, then user is provided with seamless sign in experience. In the exemplary embodiment depicted in FIG. 9 for example, the adaptor portion of the keychain module is configured to both accommodate multiple protocols and/or multiple authentication mechanisms so as to facilitate a seamless experience for the user.

With respect to the user, the following scenarios may be experienced:
1. New end user at a customer that has not subscribed to the functionality provided by the keychain portion;
2. New end user at a customer that does have the keychain portion;
3. A current end user and a company that has added the keychain module to their identity router; and
4. New end user at new company that has the keychain functionality.

In many embodiments, the keychain module may be accessed at the customer location using a GUI that is provided to an administrator of the customer, and a portal page gives user options to setup features provided by the keychain module.

If the keychain module is enabled for the customer, and the end user has not set up a keychain, an SSO Login page (e.g., a web login page served up by the identity router) may be displayed; the end user fills in username and password and selects a login option. A new button, which may be entitled "Configure Primary ID" may be utilized to resolve to a "Configure Primary ID" page that is also displayed and active.

If the keychain feature is not enabled for the customer, an SSO login page is provided to provide SSO functionality in connection with one or more embodiments described with reference to FIGS. 1-8.

If the keychain module is enabled, and the end-user has already configured aspects of the functionality provided by the keychain module, then the following may (but certainly need not have to) occur:
1. Display text "Your Primary ID is: <username>
2. Add button "Change Primary ID" which resolves to "Primary ID Configuration"

And if an end users has not set up a configuration, the following may occur:
1. Display text "Your primary ID is not setup"
2. Add button "Setup Primary ID" that resolves to "Primary ID Configuration" page.

A Primary ID Configuration page may include:

Text to describe to the end user what they are doing and the username and password that will be used. The end user may be able to change the username/password, but the end user's specific Primary ID is checked for validity (e.g., check to see if it is found in an existing User store). If validation fails, an error message may be displayed and the user may be returned to the Primary ID Configuration page.

If validation passes, then a Protected Application page may be displayed for the user, which enables the end user to set up keys on their keychain. For example, the user may be presented with a list of protected applications, and the user may select links from the displayed list of Protected applications which resolve to URLs to access the selected application.

Within the keychain module may be a cryptographically secured data store, and when enabled for a customer and an end user, it allows the end user to store credentials (typically ID and password and possibly cookies or other data) and later present them during automated login to the associated system (e.g., the local and remote applications). The basic system flow is as follows:
1. User requests an application (e.g., an application available from one of the domains$_{1-N}$);
2. Identity router detects absence of cookie that connotes valid SSO Session;
3. Identity router prompts end user for login ID and password;
4. Upon presentation of valid Login ID and password, the ID Router runs access rules against the properties retrieved about the user from the User Store configured for the application;
5. If the user is permitted access to an application, and an adaptor in the adaptor portion is available to automate the login to this application, several steps will be applied to log the user into the application automatically;
6. The adaptor will initially present the same credentials (e.g., ID and password) as were originally used to successfully login (step 3 and 4). If this succeeds no further action is required;
7. In an alternative embodiment, the system may optionally perform a lookup on an administrator-defined link field; effectively looking for a match on a user definition in a different user store that can be used to retrieve credentials that can be applied to this next login attempt via the adaptor;

8. If the keychain module is enabled, the system next steps through the records of the key chain looking for the protected application that was requested. If one is found, then the associated credential from that record are presented for automated login via the adaptor;

9. The adaptor in many variations may detect successful versus failed logins. If a login was successful, the user may interact with the application, which now considers the user fully authenticated. The application will effectively perform its own session management, and in some cases even access control.

10. If the adaptor detects a failed login, then it prompts the user for new credentials. The new credentials are presented through the adaptor and the user has the option to save these. If successful, the user may interact with the application as described in 9.

11. If keychain is enabled but there is no record for the application, the flow is similar to steps 9 and 10, and the user is prompted for credentials and given the option to save them in the key chain.

12. After valid credentials are saved in the key chain per step 11 or step 10, then when the user logs out and later logs back into the system with a request for the same application, process steps 8 and 9 will result (previously saved credentials will be retrieved and successfully used by the adaptor to log the user in).

Also shown in FIG. 9 is a multiple domain module that generally functions to enable single sign on (SSO) across the multiple domains$_{1-N}$. In many embodiments, when a user attempts to access an application, the user request comes through the identity router, and the user is authenticated by the identity router before being redirected to the domain where the application is accessed. But the identity router is not a member of the domain that the user is attempting to access, and as a consequence, the multiple domain module functions to solve at least two problems: 1.) browsers will only allow the scope of a cookie, at a maximum, to be a single secondary level domain (e.g., the domain where the identity router resides (e.g., symplified.com); and 2.) in a single AuthN transaction only one cookie may be dropped one domain. If for example, the server where the identity router resides is named sec.kb.com, then only a cookie for the domain kb.com may be dropped. This is a restriction of RFC2109.

As a consequence, the multiple domain module in the exemplary embodiment takes advantage of many embodiments of the identity router that enable the identity router to "trap" a request to a particular domain and then proxy that request to the server on the requested domain. Because of this functionality, the browser is not aware that sec.kb.com and bz.kb.com and possibly bz.kb.net are all the same server.

This problem can be overcome by tricking the browser into sending a cookie to a valid location (server), then validating that cookie to see if the user has the rights to access the originally intended destination. Once allowed access has been determined, the proxy server (e.g., apache/mod_singlepoint) may silently drop the same cookie with the scope of the domain for the requested server's domain. This is a legal operation because when a proxied request is made, the browser is not aware that the proxy server (e.g., apache/mod_singlepoint) is the server processing the request. Once the cookie has been dropped for the domain of the requested resource, the need to trick the browser goes away because the browser will send the cookie for all subsequent requests.

Figure 10:
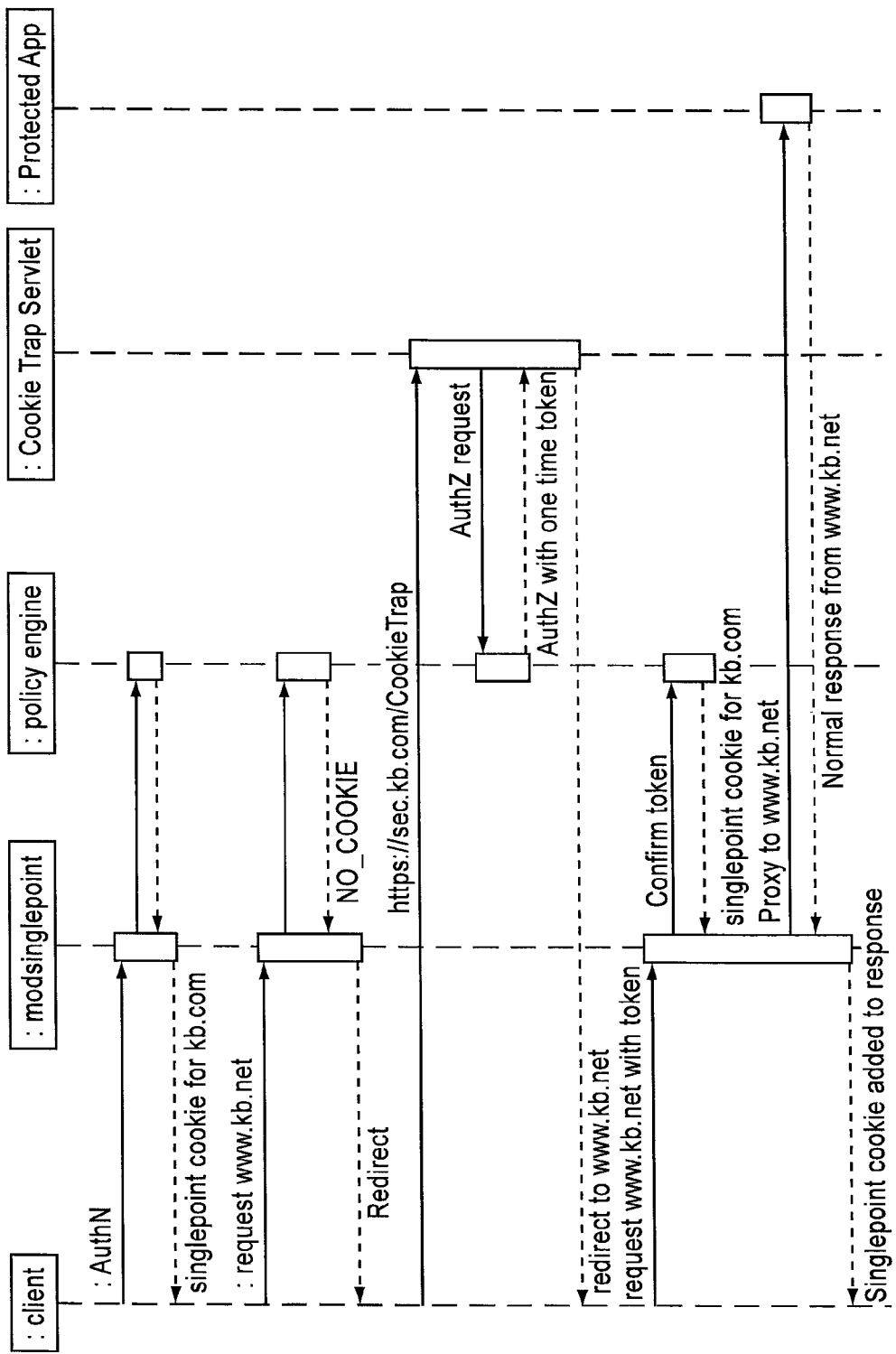
FIG. 10 is an event diagram depicting an exemplary series of steps that may be traversed in accordance with many embodiments of the present invention.

This solution may be implemented with two additions to the authorization processing: 1.) A CookieTrap Servlet; and 2.) A one-time validation token. Referring to FIG. 10, which depicts an exemplary series of events that may be carried out:

1. User authenticates and is dropped a singlepoint cookie for kb.com.
2. User makes a request for the server www.kb.net.
3. Request arrives at mod_singlepoint without the singlepoint cookie.
4. Policy Engine returns a NO_COOKIE authorization response.
5. mod_singlepoint wants to make sure the requesting user doesn't have a SinglePoint cookie. mod_singlepoint then redirects the users original request to the https://sec.**.com/CookieTrap servlet with the originally intended url(OIU).
6. CookieTrap takes the request which will now contain the SinglePoint cookie because CookieTrap is hosted on the domain scoped for the SinglePoint cookie.
7. CookieTrap will now make an authorization request to the Policy Engine passing the OIU as the server/path information.
8. If the Policy Engine approves the request a one-time-token is generated and the user is redirected to the OIU with the one-time token attached.
9. The OIU will once again arrive at mod_singlepoint but the request will now contain the one-time token.
10. mod_singlepoint accepts the one-time token as a validation from the Policy Engine that this request is allowed even though no SinglePoint cookie is present.
11. mod_singlepoint then passes the one-time token to the policy engine for confirmation of the assumption made at step #10.
12. Policy Engine gives mod_singlepoint a new copy of the SinglePoint cookie with a domain scope of the new domain (**.net).
13. mod_singlepoint then allows the proxy server (apache) to make the request but modifies the response to include the new domain-scoped SinglePoint cookie.
14. All subsequent requests to **.net now contain the SinglePoint cookie making the above steps unnecessary unless a request to new domain is made.

In many variations, the user's browser will have multiple copies of the SinglePoint cookie associated to each of the multiple domains.

Referring again to FIG. 9, also shown is a cloud connector module, which generally enables the customer to couple with remote resources (e.g., applications and/or data) as if those remote resources were a part of the infrastructure that is owned and operated by the customer. The cloud connector module in many embodiments is realized by one or more embodiments of the user store connector 572 (described with reference to FIG. 5) that is configured to communicate with remote user stores.

Many organizations (e.g., Amazon.com, Google, Salesforce.com) have available infrastructure (e.g., server-farm-type infrastructure) that is accessible by way of the network (e.g., Internet) that the customer may leverage.

In several embodiments, the cloud connector module may obtain credentials (e.g., user name and password) that enables the cloud connector module to access the third party site, query the schema of the remote user store user, and then make the attributes available to identity router for use in evaluating and enforcing access control policies. And in many embodiments, the cloud connector module enables the customer to select relevant attributes of the remote user store and map the attribute names utilized by the third party entity to the attribute names utilized by the customer.

By way of further example, the cloud connector module in some embodiments provides an interface that serves up the discovered attributes to the customer so that the customer may easily map the discovered attributes to the attributes utilized by the customer.

And in one embodiment, in addition to transforming the schema, the cloud connector module may transform the data that is stored in the remote user store. For example, if a data item in the remote user store includes extraneous data that the customer does not utilize, that extraneous information may be removed so that data that is extracted from the remote user store is normalized with the data that is utilized at the customer's location. The data that defines the mapping between the schema and/or data of the remote user store and the customer's user store may be stored locally at the customer's location or remotely at a data center (e.g., it may be stored in connection with the customer's policies).

In addition, in some embodiments, information for a customer utilized in connection with an application (e.g., an application that provides tickets to movies) at one domain (e.g., domain 1) may be extracted, mapped, and/or normalized and utilized in connection with an application (e.g., an application that provides book sales) at another domain (e.g., domain N).

Thus, the cloud connector module may bridge an enterprise across one or more clouds so that applications and services utilized by the enterprise may be distributed in the clouds. In addition, the access management functions provided by the identity router operate to bridge security and communications to enable databases, directories, and applications that are running remotely to appear as though they are running locally. As a consequence, an enterprise may avoid the cost associated with building redundant resources that would be required if the enterprise attempted to provide the databases, directories and application within the enterprise.

The identity router can also manage and provide reporting relative to each of multiple users that share one account. For example, if a customer has one account with domain 1, the identity router may track which user is accessing domain 1 and provide detailed audit information relative to each user, which would not otherwise be available.

Figure 11A:
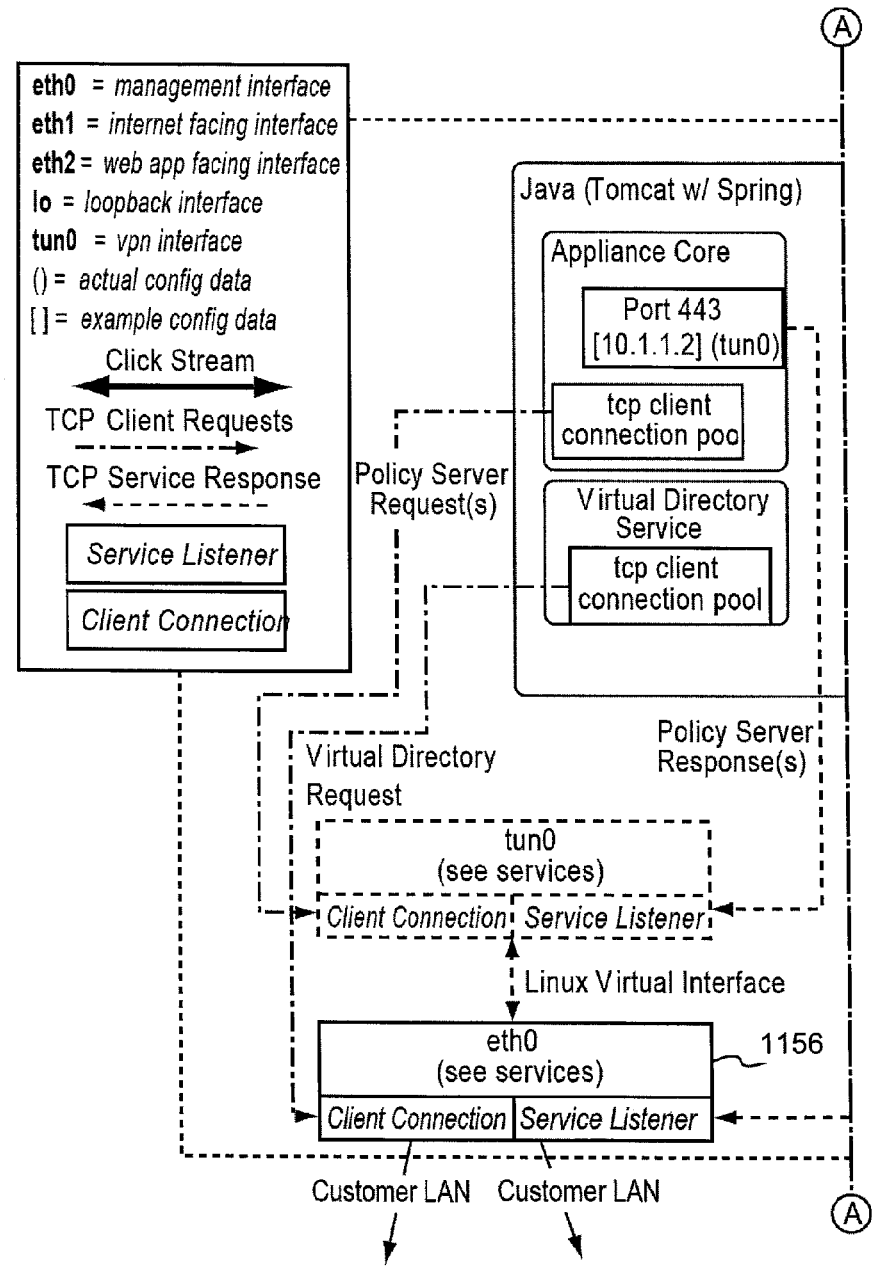
FIGS. 11A and 11B are a schematic representation of functional components of an exemplary identity router that may be deployed to realize the identity routers depicted herein.
Figure 11B:
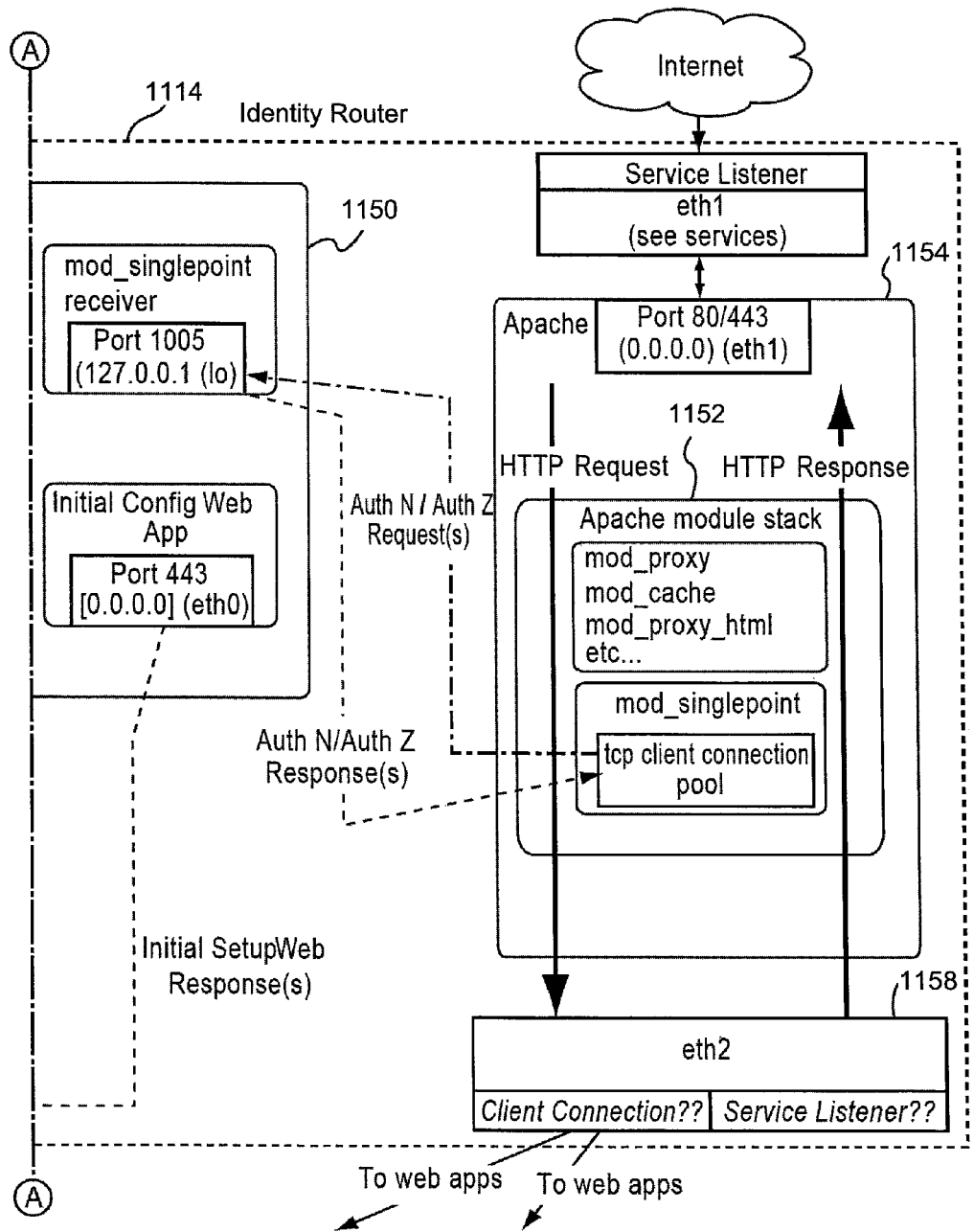

Referring next to FIG. 11, it is a schematic representation of functional components of an exemplary identity router 514 that may be deployed to realize the identity routers depicted herein. As shown, the identity router 1114 in this embodiment includes two main 'stacks' of software running. The first is a Java stack 1150 that is responsible for communicating with the controller servers in the data center, as well as policy evaluation and cookie/token generation as described further herein. The second stack 1152, which may be written in C language and be embedded in an Apache webserver 1154, may be set up in a reverse proxy configuration (mod_proxy) and configured to support content caching (mod_cache) and load balancing. The Apache webserver 1154 may be extended with a custom module in order to enforce security policies. Also shown are physical ethernet interfaces 1156, 1158, which are disposed as depicted in FIG. 11.

The identity router 1114 in many embodiments is also capable of watching all the traffic in and out of the customer's location. As a consequence, the identity router 1114 can provide a list of URLs, the applications that are being utilized, and how often. So, the particular applications at each URL may be identified and policies may be established based upon the collected information. In some embodiments, the identity router 1114 is configured to pass, by default, all communications until a particular communication raises a flag. This type of operation is opposed to the more traditional approach of filtering everything. In one embodiment for example, the identity router 514 bridges communications at layer 2 of the OSI protocol (e.g., to reduce required resources and expedite processing), but for certain addresses, it may inspect the communication at a higher level (e.g., layer three or four).

Because the identity router 1114 may be configured and disposed so that all communication goes through the identity router 1114 (e.g., it is in the click stream), the identity router 1114 may be used to log information about what a user was looking at a customer's website in connection with information about the user. And when the user accesses the customer site again, content can be specialized to that user. For example, if a sales rep wants to personalize content to a user, the sales rep can personalize content to that particular identity based upon the history of that identity. Moreover, it is contemplated that if a user has a history of accessing a web site, and finally registers with the website after accessing the website as an unregistered user, the activity of the user prior to registration may be connected with the identity of the user once it is known.

In addition, by virtue of being with the click stream, the identity router 514 may be utilized to track where a user came from. For example, a sales organization may be able to utilize the identity router 1114 to track where users visiting a website came from. This information may be utilized to map how many of those users turned into customers. In addition, the identity router 1114's ability to determine where the users came from will be used to help customers determine the efficacy of specific online marketing campaigns.

In some embodiments the identity router 1114 may also be configured to enable configuration updates in a manner that is transparent to the user. Certain network servers (e.g. apache) cannot be dynamically reconfigured; any configuration change requires that the server be restarted. And any jobs being serviced when the configuration change is made are lost, which leads to inconvenienced users. In many embodiments, a solution described below will utilize a unique combination of operating system and kernel-level techniques to enable the identity router 1114 to perform the restarts of underlying components without any impact on end-users.

Using the bridge capability that may be incorporated into the identity router 1114, the restart of a server may be rendered completely transparent to users; no jobs are lost and all connections are maintained. Thus, from the perspective of a user, the admin and/or controller servers are dynamically reconfigurable.

As previously discussed, the identity router 1114 may be disposed so that network traffic passes through the identity router 1114, which may operate as a filter, and traffic that is intended for a data center server is detected and passed on to the server. The server handles the traffic unaware that the identity router 1114 is operating as a network filter. Now suppose a change is requested in the server configuration. The new configuration is saved, a new instance of the server S2 is started, running in parallel to the original server S1, and the identity router 1114, which is dynamic, is altered to pass traffic to S2 instead of S1 once S1 has finished handling all of its old requests (from before step 3). This can be done by having a stateful filter which tracks connections and waits until they are all finished or timed out, or optionally, if the server allows this, by writing a plug-in for the server that tracks connections. And once all requests are handled, server S1 is stopped, and S2 is then in the new configuration state. No connections or users have been dropped, and service has been uninterrupted. So, from the perspective of the user, the server is dynamically reconfigurable and no changes are made to the server.

In conclusion, the present invention provides, among other things, a system and method that provides the security, manageability, compliance, integration, and automation needed by customers to scale across Internet connected businesses. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

What is claimed is:

1. A method for providing single sign-on across a plurality of resources, comprising:
   receiving a request from a user to access a particular resource of the plurality of resources;
   establishing a single sign-on (SSO) session for the user if an SSO session has not been established;
   determining if the user has been authenticated to the particular resource, and if not, retrieving credentials for the user that are specific to the particular resource from a credential store, the credential store including a plurality of different credential sets for the user corresponding to different ones of the plurality of resources;
   providing a token to a software client of the user;
   operatively presenting the credentials retrieved from the credential store to the particular resource so as to create a session with the particular resource;
   presenting a first user interface for a customer to configure access policies that define which of the plurality of resources can be accessed by the user;
   discovering an authentication subsystem of the particular resource by simulating
      a) an end user using a browser, and
      b) the browser interacting with the particular resource;
   communicating with the authentication subsystem to authenticate the user;
   connecting to one or more user stores to retrieve attributes relating to the user;
   utilizing the attributes to evaluate the access policies to determine whether or not the user should be granted access to the particular resource;
   receiving the request from the user as a proxy address that differs from the actual address of the particular resource;
   presenting a second user interface to allow the user to set credentials in the credential store relative to the particular resource;
   using characteristics of the request to determine which of a plurality of authentication subsystems to use; and
   wherein at least a portion of the characteristics of the request comprises one or more results of a previous authentication attempt for the same request with another one of the plurality of authentication subsystems.

2. The method of claim 1, wherein the second user interface allows the user to set credentials in the credential store relative to the plurality of resources, and wherein the second user interface is different from the first user interface.

3. The method of claim 1, including programmatically setting credentials relative to at least one of the plurality of resources.

4. The method of claim 1, wherein the step of receiving the request from the user as a proxy address that differs from the actual address of the particular resource is performed by a Hypertext Transfer Protocol (HTTP) proxy.

5. The method of claim 4, including creating the session with the particular resource utilizing the security assertion mark-up language (SAML) protocol.

6. The method of claim 1, wherein the simulating of
   the browser interacting with the particular resource includes simulating the browser interacting with a website.

7. The method of claim 1, including:
   receiving, from a remote resource location, the access policies; and
   using the access policies in connecting to the one or more user stores to retrieve the attributes relating to the user.

8. The method of claim 7, further comprising:
   interacting with authentication handlers; and
   dropping cookies for multiple domains so that subsequent requests from the user are recognized as coming from the user, even if the user requests resources from different domains, so as to allow the session to span multiple domains.

9. The method of claim 1, including name-space-mapping to map the user's identity across user stores by:
   providing a third-party user store user interface; and
   automatically transforming data stored in the third-party user store for use in another resource.

* * * * *